(12) United States Patent
Hanson et al.

(10) Patent No.: US 7,312,875 B2
(45) Date of Patent: Dec. 25, 2007

(54) TWO-WAVELENGTH SPATIAL-HETERODYNE HOLOGRAPHY

(75) Inventors: Gregory R. Hanson, Clinton, TN (US); Philip R. Bingham, Knoxville, TN (US); John T. Simpson, Knoxville, TN (US); Thomas P. Karnowski, Knoxville, TN (US); Edgar Voelkl, Austin, TX (US)

(73) Assignee: UT-Battelle LLC, Oak Ridge, TN (US)

( * ) Notice: Subject to any disclaimer, the term of this patent is extended or adjusted under 35 U.S.C. 154(b) by 939 days.

(21) Appl. No.: 10/421,444

(22) Filed: Apr. 23, 2003

(65) Prior Publication Data

US 2004/0213462 A1    Oct. 28, 2004

(51) Int. Cl.
*G01B 11/02* (2006.01)
(52) U.S. Cl. .................................... 356/484
(58) Field of Classification Search ............... 356/457, 356/458, 484, 485, 489
See application file for complete search history.

(56) References Cited

U.S. PATENT DOCUMENTS

| | | | |
|---|---|---|---|
| 4,812,042 A | 3/1989 | Yokokura et al. | |
| 5,299,035 A | 3/1994 | Leith et al. | |
| 5,339,152 A | 8/1994 | Horn | |
| 5,410,397 A | 4/1995 | Toeppen | |
| 5,491,552 A * | 2/1996 | Knuttel | 356/512 |
| 5,515,183 A | 5/1996 | Hashimoto | |
| 5,671,042 A | 9/1997 | Sciammarella | |
| 5,877,873 A | 3/1999 | Bashaw et al. | |
| 5,995,251 A | 11/1999 | Hesselink et al. | |
| 6,078,392 A | 6/2000 | Thomas et al. | |
| 6,262,818 B1 | 7/2001 | Cuche et al. | |
| 6,525,821 B1 | 2/2003 | Thomas et al. | |
| 6,597,446 B2 | 7/2003 | Klooster et al. | |
| 6,747,771 B2 | 6/2004 | Thomas et al. | |
| 6,809,845 B1 | 10/2004 | Kim et al. | |
| 6,999,178 B2 * | 2/2006 | Hanson et al. | 356/484 |
| 7,127,109 B1 * | 10/2006 | Kim | 356/512 |
| 2004/0021871 A1 | 2/2004 | Psaltis et al. | |
| 2004/0042015 A1 | 3/2004 | Price et al. | |
| 2004/0042056 A1 | 3/2004 | Price et al. | |
| 2004/0057089 A1 | 3/2004 | Voelkl | |
| 2004/0130762 A1 | 7/2004 | Thomas et al. | |
| 2004/0212807 A1 * | 10/2004 | Hanson et al. | 356/484 |
| 2006/0238772 A1 * | 10/2006 | Hanson et al. | 356/484 |

FOREIGN PATENT DOCUMENTS

JP     06282213     7/1994

OTHER PUBLICATIONS

Invention of Holography: D. Gabor, Proc. Roy. Soc. London Ser. A A197, 459 (1949).
Invention of Sideband (Hetrodyne) Holography: E. Leith and J. Upatnieks, J. Opt. Soc. Am. 52, 1123 (1962) and J. Opt. Soc. Am. 53 1377 (1963).

(Continued)

*Primary Examiner*—Patrick Connolly
(74) *Attorney, Agent, or Firm*—John Bruckner PC

(57) ABSTRACT

Systems and methods are described for obtaining two-wavelength differential-phase holograms. A method includes determining a difference between a filtered analyzed recorded first spatially heterodyne hologram phase and a filtered analyzed recorded second spatially-heterodyned hologram phase.

8 Claims, 11 Drawing Sheets

OTHER PUBLICATIONS

Mathematical Treatise on Holography: J.B. Develis and G.O. Reynolds, *Theory and Application of Holography*, Addison-Wesley, Reading, MA, 1967.

Holographic Interferometry: L.O. Heflinger, R.F. Wuerker, and R.E. Brooks, J. Appl. Phys. 37, 642 (1966).

Discussion of Focused Holography (used for holographic interferometry): F.E. Jahoda, R.A. Jeffries and G.A. Sawyer, Appln. Opt. 6, 1407 (1967).

*Interferogram Analysis: Digital Fringe Pattern Measurement Techniques*, M. Kujawinska, (edited by D.W. Robinson and G.T. Reid), IOP Publishing Ltd., Bristol, England, 1993).

*Holographic Interferometry: Principles and Methods*, K. Creath and T. Kreis (edited by K. Rastogi), Springer-Verlag, New York, New York, 1994.

Papers by E. Voelkl on Fourier transform analysis of electron holography: E. Voelkl, L.F. Allard, and B. Frost, J. Microscopy 180, pt. 1, Oct. 1995, pp. 39-50.

E. Voelkl, L.F. Allard, A. Datye, B. Frost, Ultramicroscopy 58, (1995), pp. 97-103.

Edgar Volkl, "Introduction to Electron Holography", pp. 133-138, published by Kluwer Academic/Plenum Publishers, New York, 1999.

Jacob et al., "High Resolution Photomask Transmission and Phase Measurement Tool", Metrology, Inspection and Process Control for Microlithography XVI, Proceedings of SPIE vol. 4689, pp. 70-82, 2002.

Thomas et al., "Direct to Digital Holography for Semiconductor Wafer Defect Detection and Review", Design, Process Integration, and Characterization for Microelectronics, Proceedings of SPIE vol. 4692, pp. 180-194, 2002.

E. Voelkl, L.F. Allard, ICEM-13 (13th International Conference on Electron Microscopy), Jul. 17-22, 1994, Paris, France, Proceedings, p. 287.

Volkl, E., et al. "Advanced Electron Holography: A New Algorithm for Image Processing and Standardized Quality Test for the FEG Electron Microscope", ULTRAMICROSCOPY 58 (1995) 97-103.

Volkl, E., et al., "A Software Package for the Processing and Reconstruction of Electron Holograms", Journal of Microscopy, vol. 180, pt. 1, Oct. 1995, pp. 39-50.

Leith, E.N. "Reconstructed Wavefronts and Communication Theory", Journal of Optical Society of America, vol. 52 No. 10, Oct. 1962.

Gabor, D., et al., "Microscopy by Reconstructed Wave-Fronts", Research Laboratory, Aug. 1948, pp. 454-487.

Leith, E.N. et al., "Wavefront Reconstruction with Continuous-Tone Objects", Journal of the Optical Society of America, vol. 53, No. 12, Dec. 1963.

Leith, E.N., et al., "Wavefront Reconstruction with Diffused Illumination and Three Dimensional Objects", Journal of the Optical Society of America, vol. 54, No. 11, Nov. 1964.

North, J.C., et al., "Holographic Interferometry", Journal of Applied Physics, vol. 37, No. 2, Feb. 1966.

Kujawinska, M., "Digital Fringe Pattern Measurement Techniques", Interferogram Analysis.

DeVelis, J.B., "Theory and Applications of Holography", (1967).

Jahoda, F.C., et al., "Fractional-Fringe Holographic Plasma Interferometry", Applied Optics, Aug. 1967, vol. 6, No. 8, pp. 1407-1410.

Jahoda, F.C., et al., "Holographic Interferometry Cookbook", Los Alamos Scientific Laboratory, Oct. 1972.

Rastogi, P.K., "Holographic Interferometry", Optical Science Center, University of Arizona, vol. 68 (1994).

Volkl, E., et al., "The Extended Fourier Algorithm. Application in Discrete Optics and Electron Holography", High Temperature Materials Laboratory, Jul. 1994.

International Search Report from PCT/US2004/012710, Jan. 7, 2005.

Written Opinion of the International Searching Authority from PCT/US2004/012710, Jan. 7, 2005.

International Search Report from PCT/US2004/012798, Feb. 16, 2005.

Written Opinion of the International Searching Authority from PCT/US2004/012798, Jan. 7, 2005.

International Search Report from PCT/US2004/012618, Feb. 21, 2005.

Written Opinion of the International Searching Authority from PCT/US2004/012618, Feb. 21, 2005.

Mendoza Santoyo F. et al. "Multi-pulsed digital holography applied to full 3D measurements of dynamic events" Proceedings of the SPIE—The International Society for Optical Engineering SPIE-Int. Soc. Opt. Eng. USA, vol. 4420, Oct. 15, 1999, pp. 132-138, XP002311234 ISSN: 0277-786X.

Pedrini G. et al. "Pulsed digital holographic interferometry with 694- and 347-nm wavelengths" Applied Optics, Optical Society of America, Washington, US, vol. 39, No. 2, Jan. 10, 2000, pp. 246-249, XP000940114 ISSN: 0003-6935.

Thomas C. E. et al. "Direct to digital holography for high aspect ratio inspection of semiconductor wafers" AIP Conference Proceedings, American Institute of Physics, New Yourk, NY, US, No. 683, Mar. 24, 2003, pp. 254-270, XP009031538 ISSN: 0094-243X.

Kruschke O. et al. Holographic interferometic microscope of complete displacement determination: Optical Engineering SPIE USA, vol. 36, nol. 9, Sep. 1997, pp. 2448-2456, XP002316736 ISSN: 0091-3286.

Khare K et al. "Direct sampling and demodulation of carrier-frequency signals" Optics Communications, North-Holland Publishing Co. Amsterdam, NL, vol. 211, No. 1-6, Oct. 1, 2002, pp. 85-94, XP004382791 ISSN: 0030-4018.

Pedrini G. et al. "Quantitative evaluation of two-dimensional dynamic deformations using digital holography" Optics and laser technology, Elsevier Science Publishers BV., Amsterdam, NL, vol. 29, No. 5, Jul. 1997, pp. 249-256, XP004090206 ISSN: 0030-3992.

\* cited by examiner

TWO-WAVELENGTH SPATIAL-HETERODYNE HOLOGRAPHY

This invention was made with United States Government support under prime contract No. DE-AC05-00OR22725 to UT-Battelle, L.L.C. awarded by the Department of Energy. The Government has certain rights in this invention.

BACKGROUND OF THE INVENTION

1. Field of the Invention

The invention relates generally to the field of direct-to-digital interferometry (spatial-heterodyne holography). More particularly, the invention relates to methods and machinery for obtaining two-wavelength differential-phase direct to digital interferograms (spatially-heterodyned holograms).

2. Discussion of the Related Art

The techniques and apparatus of basic direct to digital interferometry (holography) are well known to those of skill in the art.[1-2] A limitation of this technology is the difficulty of tracking the phase change in the object image when it involves multiple $2\pi$ steps. A $2\pi$ phase change occurs every time the optical object height changes by ½ of the laser wavelength. To obtain the full phase change of the object image, the multiple $2\pi$'s must be unwrapped. This unwrapping is often prone to errors, resulting in errors in the measured height of the object. In addition, if the height changes more than $2\pi$ over a distance less than the CCD pixel spacing at the object, the integral values of $2\pi$ of phase are completely lost (where $2\pi$ of phase shift occurs when the optical object height changes by ½ wavelength of the imaging laser beam for reflective imaging). To reduce the resulting errors, it is desirable to measure height variations at a much longer wavelength than that of the laser while still maintaining the lateral resolution of the shorter laser wavelength. This goal is accomplished in other forms of interferometry and digital holography by separately acquiring the phase data at two or more wavelengths and then looking at the difference of the phase measured by each wavelength.

The technique of using two wavelengths to measure large objects is well known in digital holography, holographic contouring and holographic interferometry.[3] In these techniques, phase information is obtained independently at two separate wavelengths.

A digital hologram of an object at a first wavelength is obtained, and then a second digital hologram at a different wavelength is obtained. Each hologram is analyzed to obtain their individual phase and amplitude information. Finally, these two sets of phase data are then processed to obtain difference-phase data proportional to a scale length (i.e., the beat wavelength defined by the first wavelength and the second wavelength). Thus, the phase is measured at an effective wavelength much longer than either of the two probing wavelengths. In this way, height variations many times greater than the original laser wavelengths used have been measured.

A serious limitation of this known approach is that noise in each individual image is uncorrelated to the noise in the other image. When the difference between the two images is taken, the noise will not be reduced and is typically increased, thereby further reducing image quality.

Heretofore, the requirement of tracking the phase change in the object image when it involves multiple $2\pi$ steps without reducing image quality has not been fully met. What is needed is a solution that addresses this problem.

SUMMARY OF THE INVENTION

There is a need for the following aspects of the invention. Of course, the invention is not limited to these aspects.

According to an aspect of the invention, a process of obtaining a differential-phase hologram at a beat wavelength defined by a first wavelength and a second wavelength includes: digitally recording a first spatially-heterodyned hologram at the first wavelength, the first spatially-heterodyned hologram including spatial heterodyne fringes for Fourier analysis; and substantially simultaneously digitally recording a second spatially-heterodyned hologram at the second wavelength that is different from the first wavelength, the second spatially-heterodyned hologram including spatial heterodyne fringes for Fourier analysis; then Fourier analyzing the recorded first spatially-heterodyned hologram by shifting a first original origin of the recorded first spatially-heterodyned hologram including spatial heterodyne fringes in Fourier space to sit on top of a spatial-heterodyne carrier frequency defined as a first angle between a first reference beam and a first object beam; Fourier analyzing the recorded second spatially-heterodyned hologram by shifting a second original origin of the recorded second spatially-heterodyned hologram including spatial heterodyne fringes in Fourier space to sit on top of a spatial-heterodyne carrier frequency defined as a second angle between a second reference beam and a second object beam, the first angle and the second angle not substantially equal; applying a first digital filter to cut off signals around the first original origin and performing an inverse Fourier transform on the result; applying a second digital filter to cut off signals around the second original origin and performing an inverse Fourier transform on the result; and then determining a difference between a filtered analyzed recorded first spatially-heterodyned hologram phase and a filtered analyzed recorded second spatially-heterodyned hologram phase.

According to another aspect of the invention, a machine to obtain a differential-phase hologram at a beat wavelength defined by a first wavelength and a second wavelength includes: a first source of coherent light energy at a first wavelength; a second source of coherent light energy at a second wavelength coupled to the first source of coherent light energy; a reference beam subassembly optically coupled to both the first source of coherent light and the second source of coherent light; an object beam subassembly optically coupled to the both the first source of coherent light and the second source of coherent light; and a beamsplitter optically coupled to both the reference beam subassembly and the object beam subassembly, the beamsplitter directing a first reference beam and a first object beam to generate a first spatially-heterodyned hologram at a first spatial-heterodyne frequency and directing a second reference beam and a second object beam to generate a second spatially-heterodyned hologram at a second spatial-heterodyne frequency that is different from the first spatial-heterodyne frequency.

According to another aspect of the invention, a process of obtaining a differential-phase hologram at a beat wavelength defined by a first wavelength and a second wavelength includes: digitally recording a first spatially-heterodyned hologram at the first wavelength, the first spatially-heterodyned hologram including spatial heterodyne fringes for Fourier analysis; Fourier analyzing the recorded first spatially-heterodyned hologram by shifting a first original origin of the recorded first spatially-heterodyned hologram including spatial heterodyne fringes in Fourier space to sit on top of a spatial-heterodyne carrier frequency defined as a first angle between a first reference beam and a first object beam; digitally recording a second spatially-heterodyned hologram at the second wavelength that is different from the first wavelength, the second spatially-heterodyned hologram including spatial heterodyne fringes for Fourier analysis; Fourier analyzing the recorded second spatially-heterodyned hologram by shifting a second original origin of the recorded second spatially-heterodyned hologram including spatial heterodyne fringes in Fourier space to sit on top of a spatial-heterodyne carrier frequency defined as a second angle between a second reference beam and a second object beam; applying a first digital filter to cut off signals around the first original origin and performing an inverse Fourier transform on the result; applying a second digital filter to cut off signals around the second original origin and performing an inverse Fourier transform on the result; and then determining a difference between a filtered analyzed recorded first spatially-heterodyned hologram phase and a filtered analyzed recorded second spatially-heterodyned hologram phase.

According to another aspect of the invention, a process of obtaining a differential-phase hologram at a beat wavelength defined by a first wavelength and a second wavelength includes: digitally recording a first spatially-heterodyned hologram at the first wavelength, the first spatially-heterodyned hologram including spatial heterodyne fringes for Fourier analysis; digitally recording a second spatially-heterodyned hologram at the second wavelength that is different from the first wavelength, the second spatially-heterodyned hologram including spatial heterodyne fringes for Fourier analysis; Fourier analyzing the recorded first spatially-heterodyned hologram by shifting a first original origin of the recorded first spatially-heterodyned hologram including spatial heterodyne fringes in Fourier space to sit on top of a spatial-heterodyne carrier frequency defined as a first angle between a first reference beam and a first object beam; applying a first digital filter to cut off signals around the first original origin and performing and inverse Fourier transform on the result; Fourier analyzing the recorded second spatially-heterodyned hologram by shifting a second original origin of the recorded second spatially-heterodyned hologram including spatial heterodyne fringes in Fourier space to sit on top of a spatial-heterodyne carrier frequency defined as a second angle between a second reference beam and a second object beam; applying a second digital filter to cut off signals around the second original origin and performing and inverse Fourier transform on the result; and then determining a difference between a filtered analyzed recorded first spatially heterodyne hologram phase and a filtered analyzed recorded second spatially-heterodyned hologram phase, wherein digitally recording the first spatially-heterodyned hologram at the first wavelength is completed before digitally recording the second spatially-heterodyned hologram.

These, and other, aspects of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein identical reference numerals designate the same elements. The invention may be better understood by reference to one or more of these drawings in combination with the description presented herein. It should be noted that the features illustrated in the drawings are not necessarily drawn to scale.

DESCRIPTION OF PREFERRED EMBODIMENTS

Figure 1:
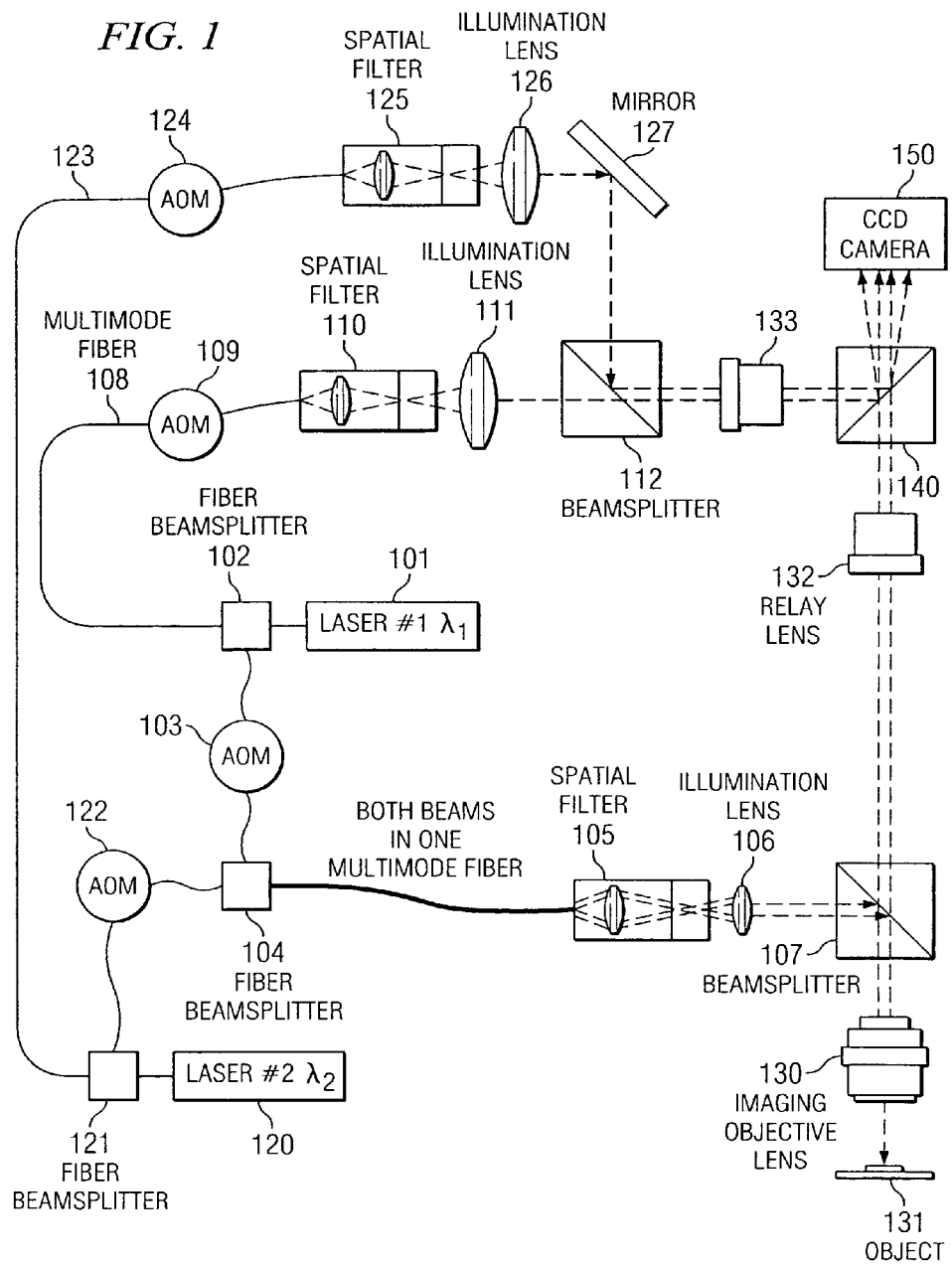
FIG. 1 illustrates a schematic view of an optical layout for a two-wavelength system, representing an embodiment of the invention.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Within this application several publications are referenced by Arabic numerals, or principal author's name followed by year of publication, within parentheses or brackets. Full citations for these, and other, publications may be found at the end of the specification immediately preceding the claims after the section heading References. The disclosures of all these publications in their entireties are hereby expressly incorporated by reference herein for the purpose of indicating the background of the invention and illustrating the state of the art.

The below-referenced U.S. Patent, and allowed U.S. Patent Application in which the issue fee has been paid, disclose embodiments that are satisfactory for the purposes for which they are intended. The entire contents of U.S. Pat. No. 6,078,392 issued Jun. 20, 2000, entitled Direct-To-Digital Holography, Holographic Interferometry, and Holovision to Clarence E. Thomas, Larry R. Baylor, Gregory R. Hanson, David A. Rasmussen, Edgar Voelkl, James Castracane, Michele Sumkulet and Lawrence Clow are hereby expressly incorporated by reference herein for all purposes. The entire contents of allowed U.S. patent application Ser. No. 09/477,267 filed Jan. 4, 2000 (published PCT/US00/34982), entitled Improvements to Acquisition and Replay Systems for Direct-to-Digital Holography and Holovision by Clarence E. Thomas and Gregory R. Hanson, in which the issue fee has been paid, are hereby expressly incorporated by reference herein for all purposes.

The invention can include sequentially obtaining a spatially heterodyned digital hologram of an object and then obtaining a second spatially heterodyned digital hologram at a slightly different wavelength. Each spatially heterodyned digital hologram can then be analyzed to obtain their individual phase and amplitude (complex wave) information. Finally, the phase can be subtracted to obtain the difference-phase proportional to the beat-wavelength. Of course, three or more spatially heterodyned digital holograms can be obtained in this way to define two or more beat wavelengths, thereby enhancing the versatility of the approach. Although this approach is a useful improvement, a limitation of this sequential approach is that noise in each individual image will typically be uncorrelated to the noise in the other image. When the difference between the two images is taken, the noise will not be reduced and may be increased, thereby reducing image quality.

The invention can include obtaining two spatially heterodyned digital holograms (e.g., one each at two different wavelengths) substantially simultaneously using the same optics and CCD. This simultaneous approach is based on the two spatially heterodyned digital holograms occupying different spatial frequencies, preferably orthogonal spatial frequencies or at least (quasi) substantially orthogonal spatial frequencies. In this way the two spatially heterodyned digital holograms can be separated and processed in Fourier space during the analysis via separate digital filters. A direct to digital holographic system can be setup (deployed) such that two direct-to-digital interferograms (heterodyned holograms) can be acquired substantially simultaneously at two separate wavelengths of the identical object (or substantially similar area of the same object) on one CCD (charge coupled device) or other spatially pixelated detection device. The two separate wavelengths can be generated by use of two separate lasers or one laser with a beamsplitter and a wavelength shifter.

Of course, the invention is not limited to the use of two spatially heterodyned holograms based on two wavelengths. Three or more wavelengths can be used to define two or more beat wavelengths.

This invention is based on the realization that two or more holograms at different laser wavelengths can be recorded substantially simultaneously and then independently isolated in Fourier space by recording each hologram at a different spatial carrier frequency. The spatial carrier frequency is determined by the angle between the object beam and reference beam (which must be coherent) when they interfere on the surface (e.g., focal plane) of the digital imaging device (e.g. CCD). By setting up the appropriate optical system, two or more object beams (at different wavelengths) can be brought substantially simultaneously to the CCD. At the same time, the two or more corresponding reference beams (one each for each object beam) can be brought to the CCD with the ability to adjust the angles between the sets of object and reference beams.

The two wavelengths can be generated with a single laser. For instance the two wavelengths could be generated by switching the laser between two different wavelengths in the sequential approach or by use of a wavelength shifting device in the simultaneous approach.

It is important to appreciate that in the simultaneous (e.g., two wavelength) embodiment of the invention, system inherent artifacts (back reflections, vibrations etc) can be correlated (assuming the wavelength difference to be sufficiently small). This is important because upon subtraction of the phase images (and/or amplitude images), system inherent artifacts can be reduced (e.g., significantly) and the resulting image thereby improved, preferably substantially. This can be a very important commercial advantage of the invention.

Never before has a technique been shown for acquiring two holograms at different wavelengths substantially simultaneously on one CCD. This type of simultaneous acquisition is not possible without the use of the direct to digital holographic technique involving spatial heterodyning of the object image (i.e., spatially-heterodyned holograms). Without the use of spatial heterodyning, it is not possible to separate the two holograms acquired substantially simultaneously on one CCD camera. Because the inventors use the interference of the object and reference beams to generate precise linear fringes to spatially heterodyne the object hologram, the inventors discovered that they can generate a second spatially-heterodyned hologram at a different spatial frequency by introducing a second optical beam into the optics system. As noted above, the different spatial frequencies can be defined by focusing the two set of beams (object and reference) onto the focal (image) plane of a CCD at two different angles. By generating the second spatially-heterodyned hologram at a different spatial carrier frequency, the two images (of approximately the same object area) can be separated and processed independently even though they are acquired in a single CCD image. The invention can include combining or mixing of (e.g., subtracting) the phase and/or object images from these two holograms to transform the scale length of the measured phase shift in each image to the difference phase at the beat wavelength of the two images.

The invention can include measuring objects with spatial height variations much greater than the imaging laser wavelength over lateral distances smaller than the wavelength.

The invention can include reduction of common-mode or correlated noise, such as back reflections and vibrations, by acquiring the two spatially-heterodyned digital holograms substantially simultaneously on the same CCD and subtracting the resulting phase and/or amplitude images.

An alternative embodiment of the invention can include the mixing of the two 3-dimensional images in Fourier space rather than after transforming back to real space. This alternative embodiment can be implemented with a computationally intensive convolution in the frequency domain.

Two-Wavelength Imaging

The invention can include recording two holograms at two different laser wavelengths in one digital image (substantially simultaneously or sequentially). This invention (which can be termed: Dual wavelength Direct to Digital Holography, 3DH) introduces a second wavelength to increase the height range of the measurement. Two holograms at two different laser wavelengths can be captured in single digital image by orienting the spatial-heterodyne fringes such that the two holograms are separated in frequency space and can be reconstructed individually. A Fourier transform of a single digital image can be performed, followed by digital filtering to separate, followed by individual reconstruction of the two holograms via an inverse Fourier transform. Once these two holograms are reconstructed a phase subtraction can be used to determine the phase response at a longer (or beat) wavelength determined by $$\lambda_b = \frac{\lambda \lambda_2}{\lambda - \lambda_2}$$

where $\lambda$ and $\lambda_2$ are the two individual wavelengths. In this method, the object under inspection is imaged by both wavelengths, which are setup to be collinear through the imaging optics. The reference beams for each wavelength are brought together at the CCD separately so that the angle between their respective object waves can be independently controlled and set to obtain the desired spatial-heterodyne frequency. Insuring the two object waves are collinear guarantees that the phase images are aligned for calculating the beat phase image or difference phase image. However, it is important to note that the invention is not limited to embodiments where both wavelengths are collinear through the imaging optics. It is only necessary that both wavelengths be collinear at the object, the invention can include embodiments where both wavelengths are collinear at the object but not other segments of the beam paths and such an embodiment is described in detail as example 5 below.

Multiple-Wavelength Imaging

The invention can include recording three or more holograms of the same object in one digital image. This can include bringing three or more wavelengths into one imaging system and recording three or more holograms, each with a different spatial frequency, in a single digital image. A limitation to recording more than two holograms in one digital image is the carryover of information between the spatially-heterodyned holograms (and the zero order image information) in Fourier space. To prevent (minimize) this spreading or carryover of this information between the holograms, the spatial-heterodyne frequencies are advantageously adjusted to maximize (optimize) the separation between the spatially-heterodyned holograms. Also, smaller radius digital filters may be required to prevent any carryover. Using smaller radius filters can have the affect of a reduction in the numerical aperture of the optical system. Alternatively, an aperture can be placed in the optical system to reduce the spread in frequency space for each individual wavelength.

The recording of holograms of a single object surface at different wavelengths allows the optimization of the beat wavelengths for different surface heights. One may select three laser wavelengths so that a short beat wavelength and a long beat wavelength are obtained. This can improve the flexibility and accuracy of the system. Alternatively, one or both lasers can have a tunable wavelength output.

The invention can include both methods and apparatus for acquiring multiple holograms in a single high-speed digital image capture, and then separating and isolating these holograms in Fourier space. The invention can also include a reconstruction algorithm for using two wavelengths to create a hologram representing a single longer beat wavelength.

As discussed above, Direct to Digital Holography (DDH) has been presented as a means for recording both phase and magnitude of a complex wavefront. As with any phase measurement technique, phase wraps occur such that a phase difference of 360 degrees cannot be distinguished from a difference of 720 degrees. By using two individual wavelengths close to one another, a long beat wavelength measurement can be made for imaging of much larger structures. The invention can include a dual-wavelength direct to digital holography (3DH) system that substantially simultaneously acquires DDH images at two different wavelengths in a single image capture. These two images can then be processed to obtain a long beat wavelength hologram.

As also discussed above, because the inventors use the interference of an object and a reference beam to spatially-heterodyne the object image at a particular spatial frequency, the inventors can generate a second spatially-heterodyned image at a different spatial frequency by introducing a second laser beam at a slightly different wavelength into the optics system. The second laser should be oriented with the necessary angular differences to produce fringes that allow the two images (of the same object area) to be separated and processed independently in frequency space (e.g., digital filtering) even though they are acquired in a single digital image. The two different wavelength lasers should have no (or very little) coherence between them to acquire both spatially-heterodyned images substantially simultaneously. A possible arrangement for such a two-wavelength system is shown in FIG. 1. With this system, by calculating the phase difference between the two reconstructed holograms, it is possible to measure surfaces with topographical (height) variations significantly greater than the imaging laser wavelengths in a single digital image. These topographical features can include both step height changes (cliffs) and continuously sloped surfaces (spheres, wedges etc).

Referring to FIG. 1, the first laser 101 operating at a wavelength of λ, is coupled to a fiber beamsplitter 102. An acousto-optic modulator (AOM) 103 is coupled to the fiber beamsplitter 102. A fiber beamsplitter 104 is coupled to acousto-optic modulator 103. A spatial filter 105 is coupled to the fiber beam splitter 104. An illumination lens 106 is optically coupled to the spatial filter 105. A beamsplitter 107 is coupled to the illumination lens 106.

Still referring to FIG. 1, a multimode fiber 108 is also coupled to the fiber beamsplitter 102. An acousto-optic modulator 109 is coupled to the multimode fiber 108. A spatial filter 110 is coupled to the acousto-optic modulator 109. An illumination lens 111 is optically coupled to the spatial filter 110. A beamsplitter 112 is optically coupled to the illumination lens 111. A second laser 120 operating at a wavelength of λ2 is coupled to a fiber beamsplitter 121. An acousto-optic modulator 122 is coupled between the fiber beamsplitter 121 and the fiber beamsplitter 104. A multimode fiber 123 is coupled to the fiber beamsplitter 121. An acousto-optic modulator 124 is coupled to the multimode fiber 123. A spatial filter 125 is coupled to the acousto-optic modulator 124. An illumination lens 126 is optically coupled to the spatial filter 125. A mirror 127 is optically coupled between the illumination lens 126 and the beamsplitter 112.

Still referring to FIG. 1, an imaging objective lens 130 is optically coupled between the beamsplitter 107 and an object 131 of interest. A relay lens 132 is optically coupled between the beamsplitter 107 and a beamsplitter 140. A relay lens 133 is optically coupled between the beamsplitter 112 and the beamsplitter 140. A CCD camera 150 is optically coupled to the beamsplitter 140. It can be appreciated that this embodiment of the invention obviates the need for reference beam mirrors. Through the use of the reference beam(s) subsystem that is configured through relay lens 133. It is an important aspect of the invention that the spatially-heterodyned direct digital holograms produced by the object and reference beams at λ1, as well as the object and reference beams operating at λ2 be focused on the focal (image) plane of the CCD Camera 150 at separate spatial frequencies, preferably orthogonal spatial frequencies or at least quasi-(substantially) orthogonal spatial frequencies.

FIG. 1 shows a simplified configuration utilizing fiber optics and a simplified reference beam optics configuration. Each laser outputs into a optical fiber. Each laser beam is then split into two beams to form the object and reference beams by beamsplitters 102 and 121, respectively. Acousto-optic modulators (AOMs) are shown in these fiber paths for shuttering the beams and adjusting individual power levels. The object beams are then combined into one optical fiber by beamsplitter 104. This fiber then directs both object beams to the illumination lens which directs the object beams through the beamsplitter 107 and the imaging objective lens onto the object. The light then reflects from the object, passes back through beamsplitter 107 towards the relay lens. The reference beams, each in its own fiber, are directed through their individual illuminations lenses and onto beamsplitter 112. Beamsplitter 112 combines the two reference beams into one optical path. The positioning of the reference beams' optical fibers and illuminations lenses allows any angle desired to be created between the two object beams. After passing through the relay lenses, the object and reference beams are combined in beamsplitter 140 and each individual wavelength object and reference beam pair interferes on the CCD. The desired spatial-heterodyne frequencies are then set by utilizing the reference beam fiber and illumination lens assemblies to create the required angle between each set of object beams and corresponding reference beams at the CCD. In this drawing, spatial filters are shown at the end of each fiber to insure good beam quality in the imaging system. Using spatial filters at the ends of the optical fibers would permit multimode fibers to be used.

Since the object and reference beams do not have identical optical paths, the wavefronts for each beam are not necessarily matched at the CCD. The matched wavefronts are important to generating the linear spatial-heterodyne fringes. The wavefronts can be sufficiently matched simply by choosing the appropriate lens for the reference beam illumination lens and adjusting the position of this lens.

The invention can include the use of two or more lasers operating at two or more different frequencies. Alternatively, the invention can include the use of one or more laser(s) coupled to one or more frequency shifter(s) (e.g. one laser exciting two dye lasers via a beamsplitter) to provide two or more wavelengths. In addition, the invention can include the use of one or more laser(s) each having two or more resonator ports, thereby reducing the number of beamsplitters required to provide a two-wavelength spatial-heterodyne configuration.

The two-wavelength spatial-heterodyne imaging technique is an extension of the DDH technique that has been established in U.S. Pat. No. 6,078,392 issued Jun. 20, 2000, entitled Direct-To-Digital Holography, Holographic Interferometry, and Holovision to Clarence E. Thomas, Larry R. Baylor, Gregory R. Hanson, David A. Rasmussen, Edgar Voelkl, James Castracane, Michele Sumkulet and Lawrence Clow and in U.S. patent application Ser. No. 09/477,267 filed Jan. 4, 2000 (published PCT/US00/34982), entitled Improvements to Acquisition and Replay Systems for Direct-to-Digital Holography and Holovision by Clarence E. Thomas and Gregory R. Hanson. In the case of DDH, we can represent a surface profile as a signal in two spatial dimensions, z(x,y). For simplicity and without loss of generality, in our discussion below we will assume y=0 initially and simply deal with a one-dimensional signal. Thus, the profile is simply z(x). We also omit some scaling constants that are due to image magnification/demagnification.

In holography, a laser reflects from the surface and the height profile is captured in the phase of the laser wavefront. We can represent this as $$s(x) = a(x)e^{j2\pi\frac{z(x)}{\lambda}} \quad (1)$$

where a(x) is the amplitude of the reflection from the imaged surface, z(x) is the surface profile as a function of spatial position x, λ is the wavelength of the light and j is Euler's Constant, or $\sqrt{-1}$. In traditional holography this signal is combined with a reference beam whose incident angle is tilted relative to the signal beam. This reference beam is coherent with the signal beam. We can represent this reference beam as $$r(x) = b(x)e^{j2\pi\frac{\theta_0 x}{\lambda}} \quad (2)$$

where $\theta_0$ represents the reference beam angle relative to the signal beam.

Figure 2:
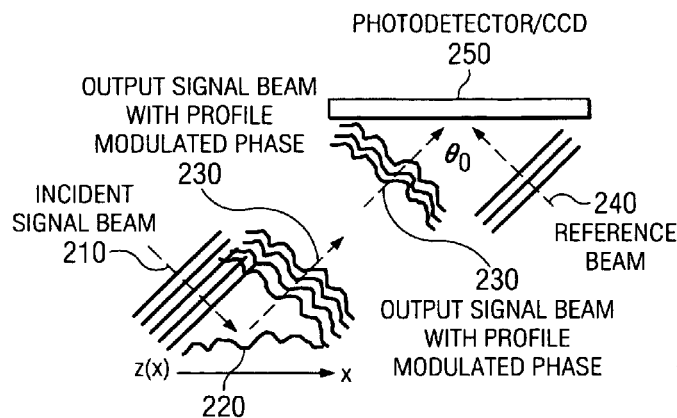
FIG. 2 illustrates a conceptual representation of a spatially-heterodyning holographic system, representing an embodiment of the invention.

A conceptual representation of the holographic configuration is shown in FIG. 2. Referring to FIG. 2, an incident signal beam 210 is reflected off a surface 220 described by z(x). A signal beam 230, phase modulated with the surface profile, is collected along with a reference beam 240 on a square-law device 250 such as a Photodetector or a Charge Coupled Device (CCD) array.

Assuming perfect coherence between the two beams, the mathematical equivalent is to multiply the signal by its complex conjugate. The detected signal is thus $$d(x) = \left(a(x)e^{j2\pi\frac{z(x)}{\lambda}} + b(x)e^{j2\pi\frac{\theta_0 x}{\lambda}}\right)\left(a*(x)e^{-j2\pi\frac{z(x)}{\lambda}} + b*(x)e^{-j2\pi\frac{\theta_0 x}{\lambda}}\right)$$

Applying Euler's Formula we obtain $$d(x) = |a(x)|^2 + |b(x)|^2 + 2a(x)b(x)\cos\left(2\pi\frac{\theta_0 x}{\lambda} + 2\pi\frac{z(x)}{\lambda}\right) \quad (3)$$

This signal is a modulated sinusoid with a spatial frequency of $$\frac{\theta_0}{\lambda}$$

and a phase of $$\frac{z(x)}{\lambda}.$$

Figure 3A:
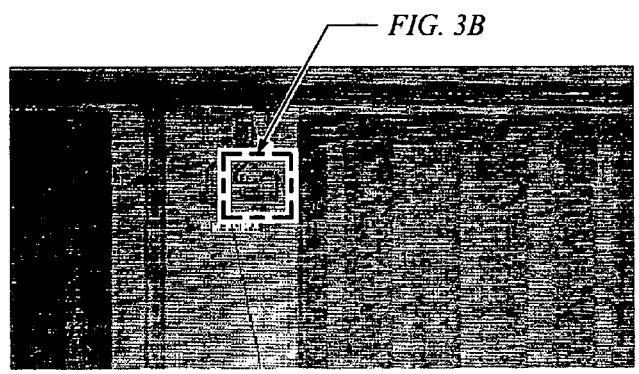
FIGS. 3A and 3B illustrate fringes produced by the reference and signal beam of a square law device, representing an embodiment of the invention.
Figure 3B:
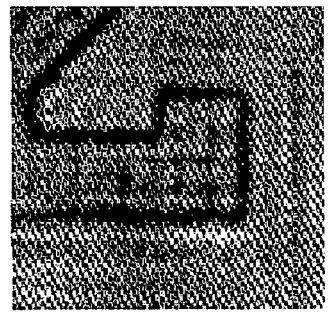

An example of a two-dimensional signal of this type is shown in FIGS. 3A-3B. FIG. 3B is an magnified portion of FIG. 3A. Referring to FIGS. 3A-3B, the 'fringes,' or diagonal line patterns are sinusoidal intensity levels produced by the reference and signal beam on the square law device.

Figure 4A:
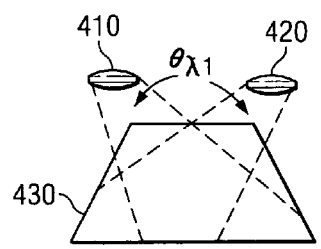
FIGS. 4A and 4B illustrate the dependence of spatial frequency on the angle between the signal and reference beams, representing an embodiment of the invention.
Figure 4B:
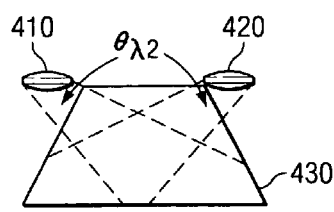

It should be noted that the spatial frequency is directly proportional to the incident angle between the reference and object beams as illustrated in FIGS. 4A-4B. Referring to FIG. 4A an object beam 410 and a reference beam 420 are focused on a focal plane 430 of a CCD device defining an angle $\theta_{\lambda,1}$. Referring to FIG. 4B the object beam 410 and the reference beam 420 are focused on the focal plane 430 of the CCD device defining an angle $\theta_{\lambda,2}$. It should be appreciated that the angle $\theta_{\lambda,1}$ is less than the angle $\theta_{\lambda,2}$ and, therefore the density of the fringes in FIG. 4B is higher. The density of the fringes is directly proportional to the "spatial frequency", or the angle between the signal and reference beams; the direction of the fringes depends on the location of the signal and reference beams.

In DDH, the signal represented by Eq. 3 is captured with a digital camera and transformed via Fast Fourier Transform algorithms to a spatial frequency representation.[4] Using α to represent spatial frequency, and ⊗ to represent convolution, the FFT produces $$D(\alpha) = \mathfrak{J}(|a(x)|^2) + \mathfrak{J}(|b(x)|^2) + 2A(\alpha) \otimes B(\alpha) \otimes$$

$$\left\{\delta\left(\alpha - \frac{\theta_0}{\lambda}\right) + \delta\left(\alpha + \frac{\theta_0}{\lambda}\right)\right\} \otimes \mathfrak{J}\left(e^{j2\pi\frac{z(x)}{\lambda}}\right)$$

In the frequency domain it is very easy to isolate the third term above from the first two terms because the former is centered at the carrier frequency represented by $$\frac{\theta_0}{\lambda}.$$

In DDH we take the signal centered at one sideband, shift the sideband to the center of the frequency domain, and filter it with a filter w(x) as shown in the 2-D representation in FIG. 5.

Figure 5A:
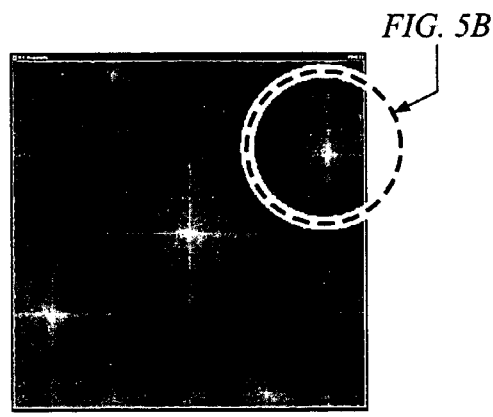
FIG. 5A illustrates the magnitude response of a 2-D Fourier spectrum of a phase-modulated sinusoidal signal, representing an embodiment of the invention.
Figure 5B:
FIG. 5B illustrates the magnitude response result of moving the upper sideband to the center of the Fourier plane, representing an embodiment of the invention.
Figure 5C:
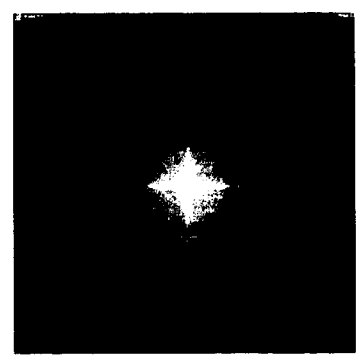
FIG. 5C illustrates filtered magnitude response results (the signal is complex and the phase of the spectrum encodes the surface profile), representing an embodiment of the invention.

FIGS. 5A-5C show: a) 2-D Fourier spectrum of phase-modulated sinusoidal signal; b) result of moving the upper sideband to the center of the Fourier plane; and c) filtered results. (Although these images show only the magnitude response, the signal in c) is complex and the phase of the spectrum encodes the surface profile.)

We take the signal of FIG. 5(c) and take the inverse FFT:

$$D'(\alpha) = W(\alpha)\left\{A(\alpha) \otimes B(\alpha) \otimes \mathfrak{J}\left(e^{j2\pi\frac{z(x)}{\lambda}}\right)\right\} \quad (4)$$

$$d'(x) = \mathfrak{J}^{-1}\{D'(\alpha)\} = w(x) \otimes \left\{a(x)b(x)e^{j2\pi\frac{z(x)}{\lambda}}\right\}$$

Applying Euler's Formula again we find $$d'(x) = w(x) \otimes \left\{a(x)b(x)\left\{\cos\left(2\pi\frac{z(x)}{\lambda}\right) + j\sin\left(2\pi\frac{z(x)}{\lambda}\right)\right\}\right\} \quad (5)$$

The real and imaginary components above are already available in our digital representation, so we can compute the surface profile at every x with the formula $$z(x) = \frac{\lambda}{2\pi}\tan^{-1}\left(\frac{I}{R}\right) \quad (6)$$

where I and R are the real and imaginary components of the reconstructed image. For 3DH utilizing two wavelengths, we perform the same operations described above a second time at a slightly different wavelength. We will discuss this second operation as if it occurs as a completely different measurement, but the invention may perform the measurements substantially simultaneously to address, and preferably avoid, problems of noise, processing speed, and imaging quality.

The operations for each of these two wavelengths are identical to the previous single wavelength case, but with the different wavelength we capture the opposite sideband or, alternately, digitally reverse the phase. In either case, after demodulation, the second signal is $$d'_2(x) = \mathfrak{J}^{-1}\{D'_2(\alpha)\} = w(x) \otimes \left\{a(x)b(x)e^{-j2\pi\frac{z(x)}{\lambda_2}}\right\} \quad (7)$$

We can combine these signals of Equations 4 and 7 digitally through a multiplicative process; focusing on the phase term, we find $$DualPhase = e^{-j2\pi \frac{z(x)}{\lambda_2}} e^{j2\pi \frac{z(x)}{\lambda}} = e^{j2\pi z(x)\frac{\lambda-\lambda_2}{\lambda\lambda_2}} \quad (7a)$$

We see that we have effectively performed holography with an optical device of wavelength $$\lambda_b = \frac{\lambda\lambda_2}{\lambda - \lambda_2} \quad (8)$$

For instance, for a wavelength of 550 nm and 560 nm, the beat wavelength $\lambda_b$ is 30800 nm or 30.8 micrometers. Thus, a $2\pi$ phase wrap occurs every 15.4 micrometers instead of every 280 nm, allowing our system to image much sharper, deeper depth transitions than is possible with a single wavelength.

The dual phase equation (7a) can now be used to resolve the basic phase ambiguity in the computed low noise phase of either of the initial holograms. First, for $z(x) > \lambda$, equation (6) is written as:

$$z(x) = \frac{\lambda_1}{2\pi}(\varphi_1(x) \pm 2\pi k_1(x)) \quad \text{with } k_1(x) \text{ an integer} \quad (9)$$

where $\phi_1(x) = \tan^{-1}(I/R)$ within the range of $[-\pi,\pi]$. Thus, based on the measurement of $\phi_1(x)$, the value obtained for $z(x)$ is ambiguous. From the dual phase, we obtain the surface profile $$z_b(x) = \frac{\lambda_b}{2\pi}(\varphi_b(x) \pm 2\pi k_b(x)) \quad (10)$$

where $z_b(x)$ is the surface profile for the beat wavelength $\lambda_b$. Note that $z(x)$ and $z_b(x)$ refer to the same surface profile. Since the beat wavelength is much longer than the individual wavelengths, assume $z_b(x) < \lambda_b$, then $k_b(x) = 0$ and $z_b(x)$ is unambiguously calculated from equation (10). Therefore, $$z_b(x) = \frac{\lambda_1}{2\pi}(\varphi_1(x) \pm 2\pi k_1(x)) \quad (11)$$

Rearranging, $k_1(x)$ is calculated as $$k_1(x) = \frac{z_b(x)}{\lambda_1} - \frac{\varphi_1(x)}{2\pi} \quad (12)$$

The fact that $k_1(x)$ must be an integer can reduce noise in the final $z(x)$ when computed using equation (9), if the noise in $z_b(x)$ is less than $\lambda_1/2$. This is of great importance as it turns out experimentally that by computing $\phi_b(x)$, not only is the directly interpretable range for $z(x)$ expanded, but also its noise is amplified, in both cases by about $(\lambda/(\lambda-\lambda_2))$.

It can, therefore, be appreciated that the invention can include the steps of: digitally recording a first spatially-heterodyned hologram at the first wavelength, the first spatially-heterodyned hologram including spatial heterodyne fringes for Fourier analysis; Fourier analyzing the recorded first spatially-heterodyned hologram by shifting an origin of the recorded first spatially-heterodyned hologram including spatial heterodyne fringes in Fourier space to sit on top of a spatial-heterodyne carrier frequency defined as a first angle between a first reference beam and a first object beam; digitally recording a second spatially-heterodyned hologram at the second wavelength that is different from the first wavelength, the second spatially-heterodyned hologram including spatial heterodyne fringes for Fourier analysis; Fourier analyzing the recorded second spatially-heterodyned hologram by shifting an origin of the recorded second spatially-heterodyned hologram including spatial heterodyne fringes in Fourier space to sit on top of a spatial-heterodyne carrier frequency defined as a second angle between a second reference beam and a second object beam; applying a first digital filter to cut off signals around a first original origin and performing an inverse Fourier transform on the result; applying a second digital filter to cut off signals around a second original origin and performing an inverse Fourier transform on the result; and then determining a difference between a filtered analyzed recorded first spatially-heterodyned hologram phase and a filtered analyzed recorded second spatially-heterodyned hologram phase. While determining the difference requires that the other steps be completed first, the invention is not limited to a particular sequence of the other steps, other than the individual meta-subsequences of recording, followed by analysis, followed by filtering.

Figure 6:
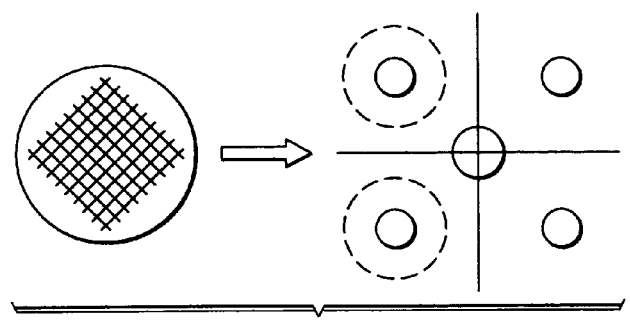
FIG. 6 illustrates a conceptual representation of a two-wavelength imaging system, representing an embodiment of the invention.

Mathematically there are several approaches for calculating the phase difference between two complex images. In a first approach, a complex division can be performed that results and a complex images having a magnitude equal to the ratio of the two image intensities and a phase equal to the difference between the two image phases. In a second approach, multiplying the complex conjugate of one complex image by the other results in a complex image with intensity equal to the multiplication of the two image intensities and phase equal to the difference between the two image phases. Incidentally, the second approach is interesting in that the complex conjugate can be obtained with no extra calculation by simply choosing the complex conjugate sideband in frequency space during reconstruction. A third approach can include subtracting the two phase images, but wraps in the phase images must be dealt with by implementing (writing and/or coding) a phase aware subtraction. Of course, the invention is not limited to these approaches. Generically, the approaches can be described as determining a difference between first and second reconstructed hologram phases. The invention can capture images for both wavelengths with a single image capture operation by setting up quasi-orthogonal fringes, as illustrated in FIG. 6. Two sets of fringes are seen in the portion of the image in FIG. 6 on the left, with lines running from the lower left to the upper right representing one wavelength and lines running from the upper left to the lower right representing the other wavelengths. These are Fourier transformed together to produce two independent sets of sidebands. Sidebands from the first set of fringes (blue) are in the upper left and lower right of the portion of the image in FIG. 6 on the right. Sidebands from the second set of fringes are in the lower left and upper right of the portion of the image in FIG. 6 on the right. The sidebands in the dashed circles are used to produce the phase difference signal at the effective longer wavelength. This allows two images to be isolated in frequency space and eliminates problems associated with acquiring images at different points in time.

Figure 7:
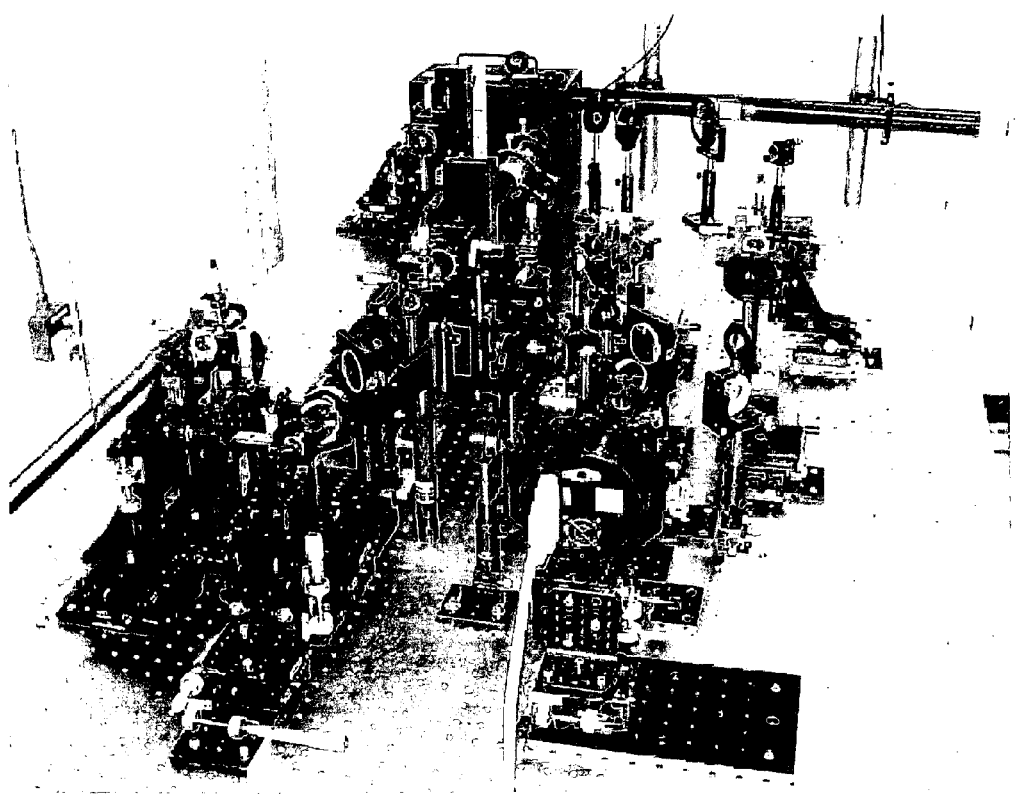
FIG. 7 illustrates a perspective view of an actual two-wavelength proof of principle system, representing an embodiment of the invention.
Figure 8A:
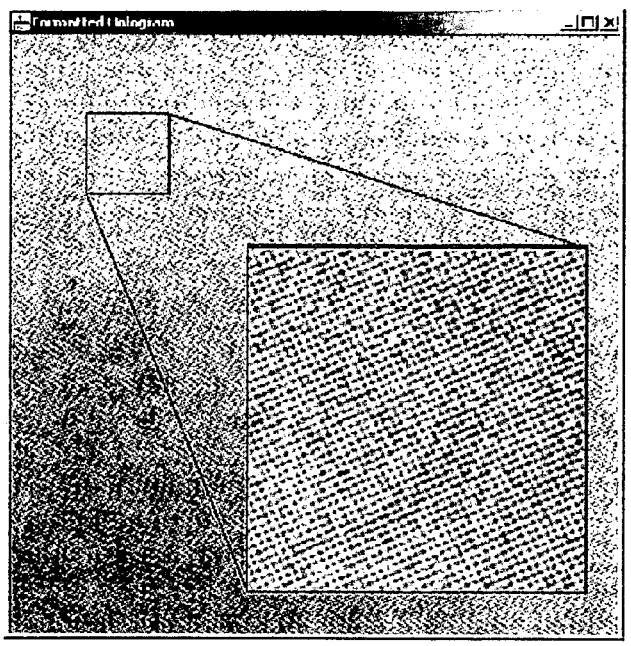
FIGS. 8A and 8B illustrate a two-wavelength spatially-heterodyned hologram and corresponding fast Fourier transform, respectively, representing an embodiment of the invention.
Figure 8B:
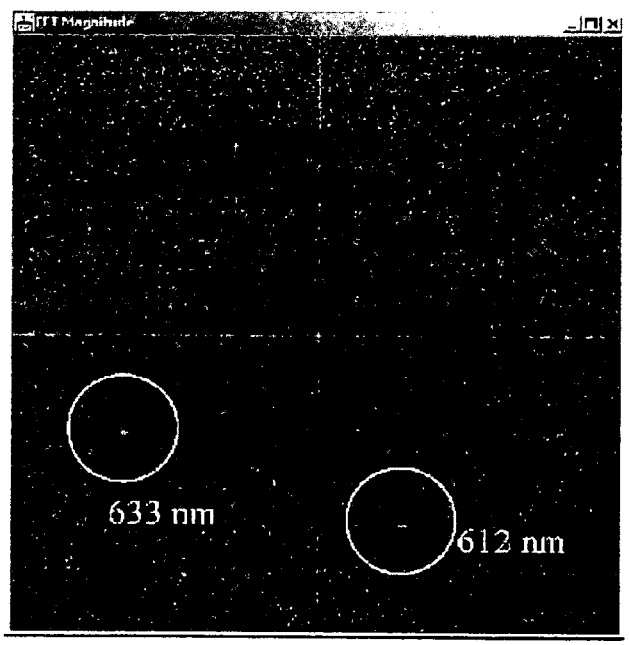

A tabletop proof of principle (POP) system for the two-wavelength 3DH concept has been implemented and is shown in FIG. 7. The POP system has been used to verify the two-wavelength imaging capabilities and identify technical challenges for making a robust 3DH system for metrology and inspection. A beat wavelength of 18.527 um is obtained with the POP system using laser wavelengths of 632.8 nm and 611.9 nm. FIG. 8 shows a hologram taken with the POP system showing the two sets of fringes in a checkerboard pattern along with the corresponding FFT showing the isolated sidebands created by the two fringe patterns.

Figure 9A:
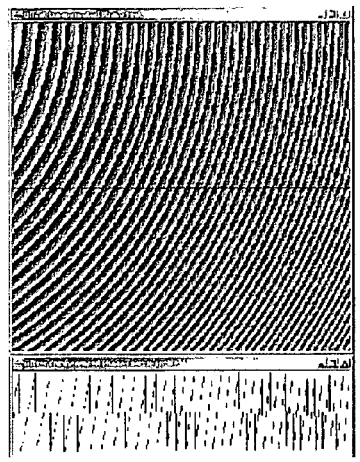
FIGS. 9A-9C illustrate two-wavelength direct-to-digital phase images of a concave mirror, representing an embodiment of the invention.
Figure 10A:
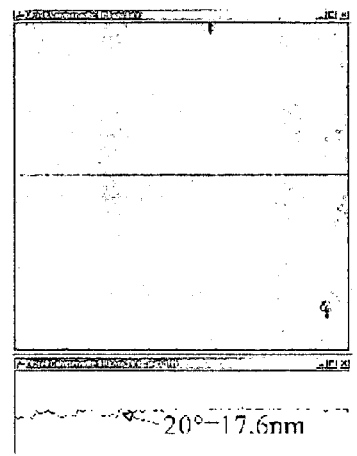
FIG. 10A illustrates a 632.8 nm wavelength phase image of a 2.8 um resolution target, representing an embodiment of the invention.
Figure 9B:
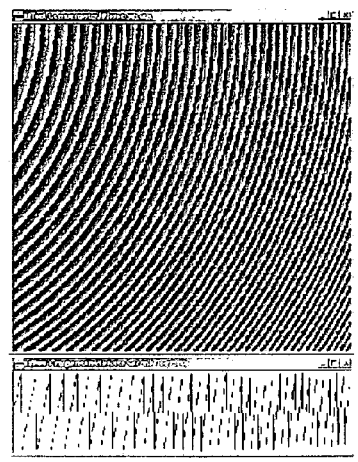
Figure 10B:
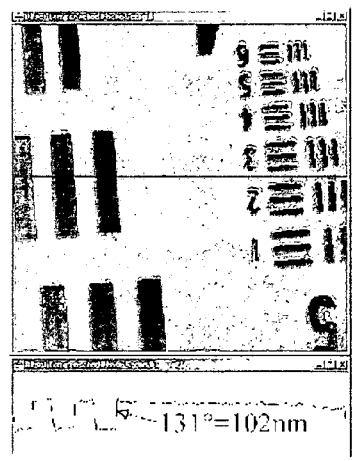
FIG. 10B illustrates a 611.9 nm wavelength phase image of the 2.8 um resolution target, representing an embodiment of the invention.
Figure 9C:
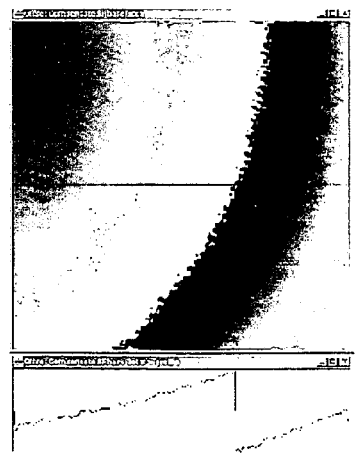
Figure 10C:
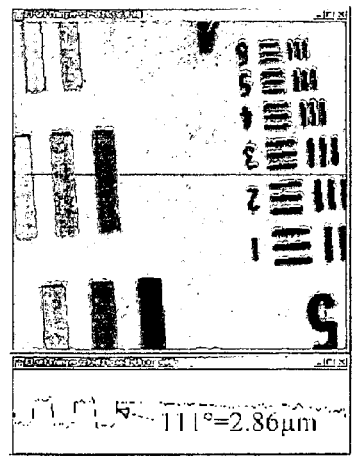
FIG. 10C illustrates a 18.5 um beat wavelength phase image of the 2.8 um resolution target, representing an embodiment of the invention.

FIGS. 9 and 10 give two examples of phase imagery from the POP system. FIG. 9 shows phase information from a concave mirror with a 52.8 mm radius of curvature. The left and center images show the phase information obtained by the two individual wavelengths while the right shows the beat wavelength image. This example quickly demonstrates the advantage of the beat wavelength. For this mirror surface, only one wrap appears in the beat wavelength image while over 30 wraps occur in the individual wavelength images. The shape of the mirror surface could also be determined by unwrapping the individual wavelength images; however, phase unwrapping is a complicated problem that is greatly affected by noise in the image.

FIG. 10 is a phase image of a gold on gold resolution target with a height of 2.8 microns. The two left most images are phase reconstructions for the two individual wavelengths. These individual wavelengths have wrapped 9 times plus a fraction of a wrap. The height obtained by the single wavelengths is a measure of the remaining fraction after wrapping. Thus, the 632.8 nm wavelength image looks as if the structure is only 17 nm high and the 612 nm wavelength image measures the structure to be 102 nm high. The rightmost image is the two-wavelength phase reconstruction. With a beat wavelength of 18.5 um no wraps occur and the true height measurement is calculated from the phase height difference. The phase/height differences between the two levels in the third image are 111 degrees/2.865 um as expected.

The POP system verifies the extensibility of the DDH system to larger objects with two wavelengths captured in a single image by the 3DH technique. Three key issues became apparent while using the POP system. 1.) Previously we had only imaged fairly flat objects with respect to the individual wavelengths. When imaging objects with large slopes, the carrier is spread out in frequency space. This will require more robust search routines to find and isolate the information encoded by the two individual wavelengths. 2.) Phase noise in the beat wavelength image (normalized to wavelength) is approximately equal to that in the individual wavelength images; however, a single degree of phase noise in the beat wavelength image corresponds to a height error 30 times greater than the same phase noise in a single wavelength image. 3.) In the POP system, illumination is impinged on the sample at a fairly large angle to reduce back reflections in the optics. Based on experimental experience with actual; samples, on-axis illumination is preferred if the back reflection noise can be reduced. On-axis illumination allows the steepest slopes in all directions to be present and still be properly imaged.

EXAMPLES

Specific embodiments of the invention will now be further described by the following, nonlimiting examples which will serve to illustrate in some detail various features. The following examples are included to facilitate an understanding of ways in which the invention may be practiced. It should be appreciated that the examples which follow represent embodiments discovered to function well in the practice of the invention, and thus can be considered to constitute preferred modes for the practice of the invention. However, it should be appreciated that many changes can be made in the exemplary embodiments which are disclosed while still obtaining like or similar result without departing from the spirit and scope of the invention. Accordingly, the examples should not be construed as limiting the scope of the invention.

Example 1

Figure 11:
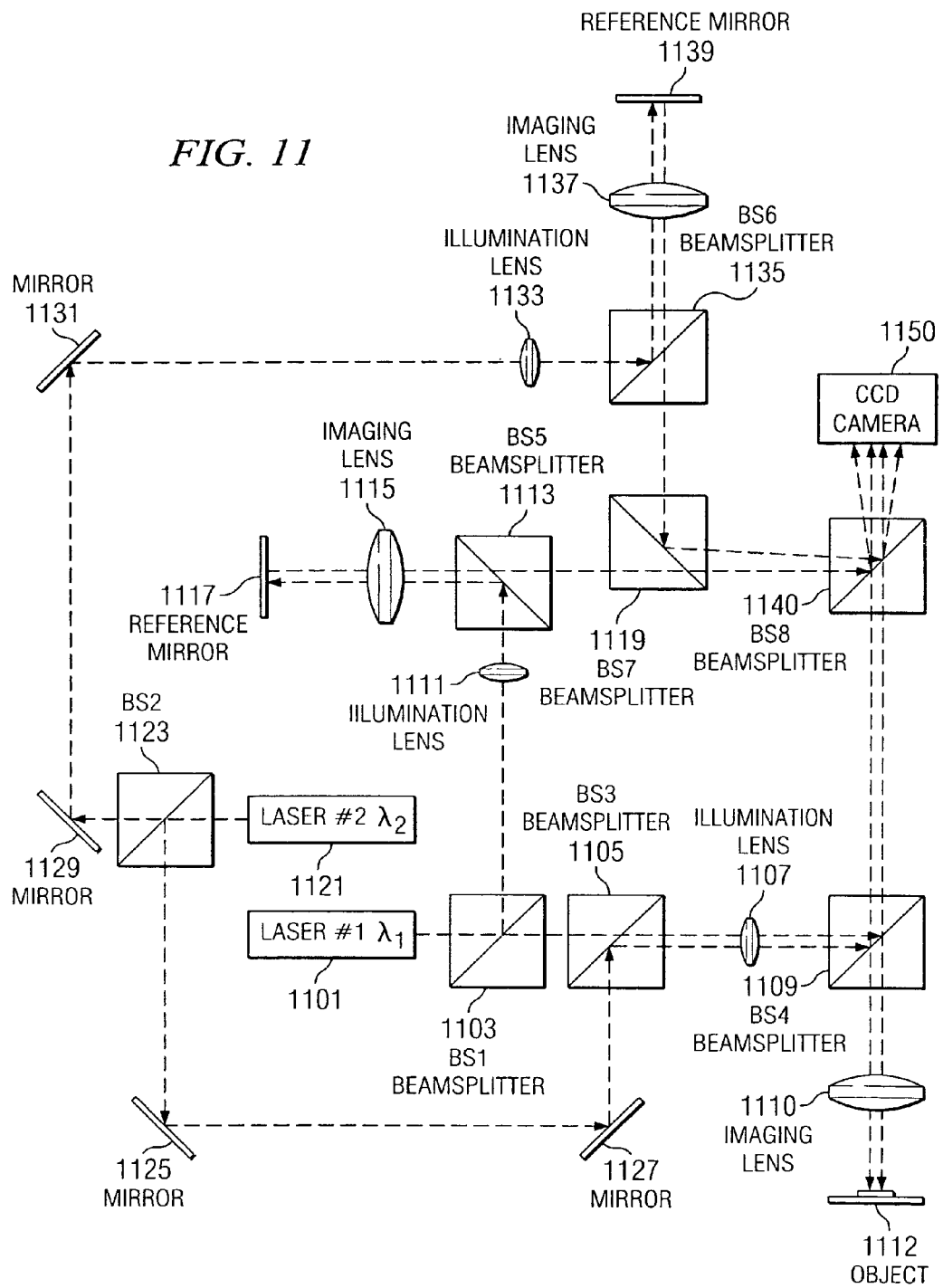
FIG. 11 illustrates a schematic view of another optical layout, representing an embodiment of the invention.

Referring to FIG. 11, a free space exemplary embodiment of the invention is depicted using reference mirrors. A first laser 1101 operating at a wavelength $\lambda_1$ is optically coupled to a beamsplitter 1103. A beamsplitter 1105 is optically coupled to the beamsplitter 1103. An illumination lens 1107 is optically coupled to the beamsplitter 1105. A beamsplitter 1109 is optically coupled to the illumination lens 1107. An imaging lens 1110 is optically coupled to the beamsplitter 1109. An area of a surface of an object 1112 of interest is optically coupled to the imaging lens 1110. An illumination lens 1111 is optically coupled to the beamsplitter 1103. A beamsplitter 1113 is optically coupled to the illumination lens 1111. An imaging lens 1115 is optically coupled to the beamsplitter 1113. A reference mirror 1117 is optically coupled to the imaging lens 1115. A beamsplitter 1119 is optically coupled the beamsplitter 1113.

Still referring to FIG. 11, a second laser 1121 operating at a wavelength $\lambda_2$ is optically coupled to a beamsplitter 1123. A mirror 1125 is optically coupled to the beam splitter 1123. A mirror 1127 is optically coupled to the mirror 1125 and the beamsplitter 1105. A mirror 1129 is optically coupled to the beamsplitter 1123. A mirror 1131 is optically coupled to the mirror 1129. An illumination lens 1133 is optically coupled to the mirror 1131. A beamsplitter 1135 is optically coupled to the illumination lens 1133 and to the beamsplitter 1119. An imaging lens 1137 is optically coupled to the beamsplitter 1135. A reference mirror 1139 is optically coupled to the imaging lens 1137. A beamsplitter 1140 is optically coupled to the beamsplitter 1109 and to the beamsplitter 1119. A charge coupled device camera 1150 is optically coupled to the beam splitter 1140. FIG. 11 shows one basic implementation in which the object and reference beams utilize identical optical components to insure matched wavefronts between the object beam and the reference beam for each wavelength. Each laser output is divided into two beams by the first beamsplitters encountered (BS1 and BS2, respectively, for $\lambda_1$ and $\lambda_2$). These two beams then become the object and reference beams for that laser wavelength. The object beams for both wavelengths are then brought together in one optical path by beamsplitter BS3. The two object beams are then directed to the imaging lens by beamsplitter BS4. The reflected object image is then directed back towards the CCD by passing through BS4. The reference beams are directed towards their respective reference lenses and mirrors by beamsplitters BS5 and BS6. Upon reflection from the reference mirrors, each of the reference beams passes back through its beamsplitter, BS5 and BS6. Beamsplitter BS7 then is used to combine the two reference beams into one optical path but with a small angular difference between them, created by the positioning of BS7. The final beamsplitter BS8 combines the collinear object beams with the reference beams so that they then interfere on the CCD. Since $\lambda_1$ and $\lambda_2$ are not coherent with respect to one another, two separate spatially heterodyned holograms are created with different spatial frequencies. The spatial frequencies are set by the angle between the object and reference beams for each wavelength. These angles are set by and adjusted by the positioning of BS7 and BS8.

Example 2

Figure 12:
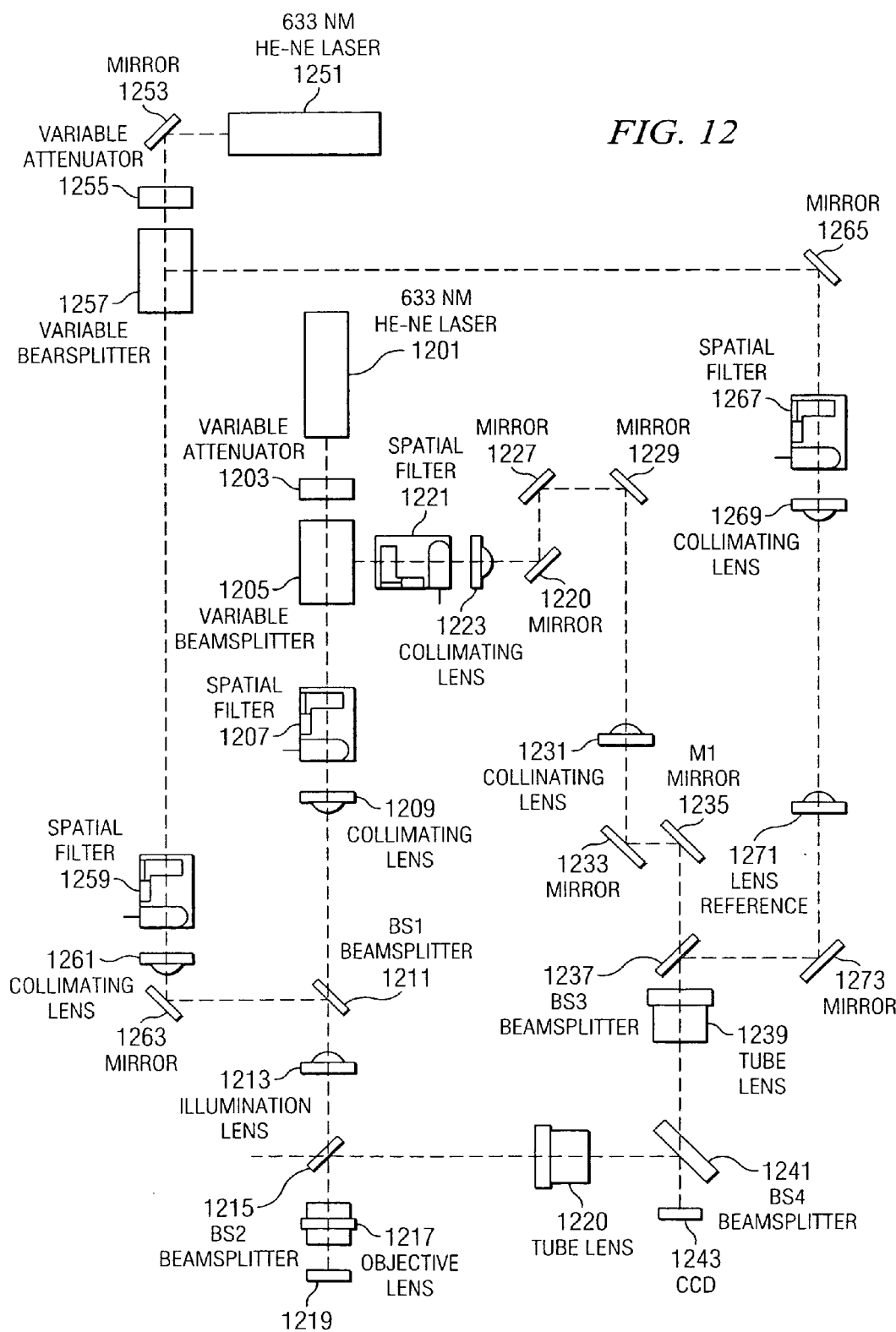
FIG. 12 illustrates a schematic view of another optical layout, representing an embodiment of the invention.

Referring to FIG. 12, a free space exemplary embodiment of the invention is depicted where reference mirrors are omitted. A helium neon laser 1201 operating at a wavelength of 611.9 nanometers is optically coupled to a variable attenuator 1203. A variable beamsplitter 1205 is optically coupled to the variable attenuator 1203. A spatial filter 1207 is optically coupled to the variable beamsplitter 1205. A collimating lens 1209 is optically coupled to the spatial filter 1207. A beamsplitter 1211 is optically coupled to the collimating lens 1209. An illumination lens 1213 is optically coupled to the beamsplitter 1211. A beamsplitter 1215 is optically coupled to the illumination lens 1213. An objective lens 1217 is optically coupled to the beamsplitter 1215. A target 1219 having a surface area of interest is optically coupled to the objective lens 1217. A tube lens 1220 is optically coupled to the beamsplitter 1215. A spatial filter 1221 is optically coupled to the variable beamsplitter 1205. A collimating lens 1223 is optically coupled to the spatial filter 1221. A mirror 1225 is optically coupled to the collimating lens 1223. A mirror 1227 is optically coupled to the mirror 1225. A mirror 1229 is optically coupled to the mirror 1227. A reference lens 1231 is optically coupled to the mirror 1229. A mirror 1233 is optically coupled to the reference lens 1231. A mirror 1235 is optically coupled to the mirror 1233. A beamsplitter 1237 is optically coupled to the mirror 1235. A tube lens 1239 is optically coupled to the beamsplitter 1237. A beamsplitter 1241 is optically coupled to the tube lens 1239 and to the tube lens 1220. A charge coupled device camera 1243 is optically coupled to the beamsplitter 1241.

Still referring to FIG. 12, a second helium neon laser 1251 operating at a wavelength of 632.8 nanometers is optically coupled to a mirror 1253. A variable attenuator 1255 is optically coupled to the mirror 1253. A variable beamsplitter 1257 is optically coupled to the variable attenuator 1255. A spatial filter 1259 is optically coupled to the variable beamsplitter 1257. A collimating lens 1261 is optically coupled to the spatial filter 1259. A mirror 1263 is optically coupled to the collimating lens 1261 and to the beamsplitter 1211. A mirror 1265 is optically coupled to the variable beamsplitter 1257. A spatial filter 1267 is optically coupled to the mirror 1265. A collimating lens 1269 is optically coupled to the spatial filter 1267. A reference lens 1271 is optically coupled to the collimating lens 1269. A mirror 1273 is optically coupled to the reference lens 1271 and to the beamsplitter 1237.

FIG. 12 shows a schematic of the proof-of-principle system used to demonstrate the first two-wavelength spatial-heterodyne imaging. A 632.8 nm HeNe laser and a 611.9 nm HeNe laser are used to generate the two different wavelengths. These wavelengths have a beat wavelength of 18.5 μm. Each laser beam passes through a variable attenuator and then a variable beamsplitter. The variable beamsplitters generates two output beams with an infinitely variable power balance between the two output beams.

The variable attenuators are then used to set the total beam power. Spatial filters located after the variable attenuators filter the beams to insure a clean Gaussian beam structure. Collimating lenses are used to collect the light from the spatial filters. The object beams are then combined by a beamsplitter, BS1, so that they are collinear. They then path through the illumination lens, which focuses the beams into the objective lens. These beams then reflect off of the object surface and pass back through the objective lens. Beamsplitter BS2 then reflects these object beams towards the tube lens and beamsplitter BS4 which will combine the object and reference beams.

The reference beams also pass through spatial filters and collimating lens. Mirrors may be used to adjust pathlengths and correctly position the beams. The beams then pass through the reference beam illumination lenses which give the beams the correct wavefront shape for matching to the object beam wavefronts. Additional mirrors are used to bring the two reference beams together at beamsplitter BS3. The two reference beams then pass through the tube lens and onto the beamsplitter BS4. The object and reference beams are then combined into one path by BS4 so that they interfere at the CCD, creating two separate interference patterns, one for each wavelength. The interference fringes are set to be approximately orthogonal by adjusting the angle of interference between the individual wavelength object and reference beams by adjusting BS3 for the 632.8 nm wavelength, and mirror M1 for the 611.9 nm wavelength.

Example 3

Figure 13:
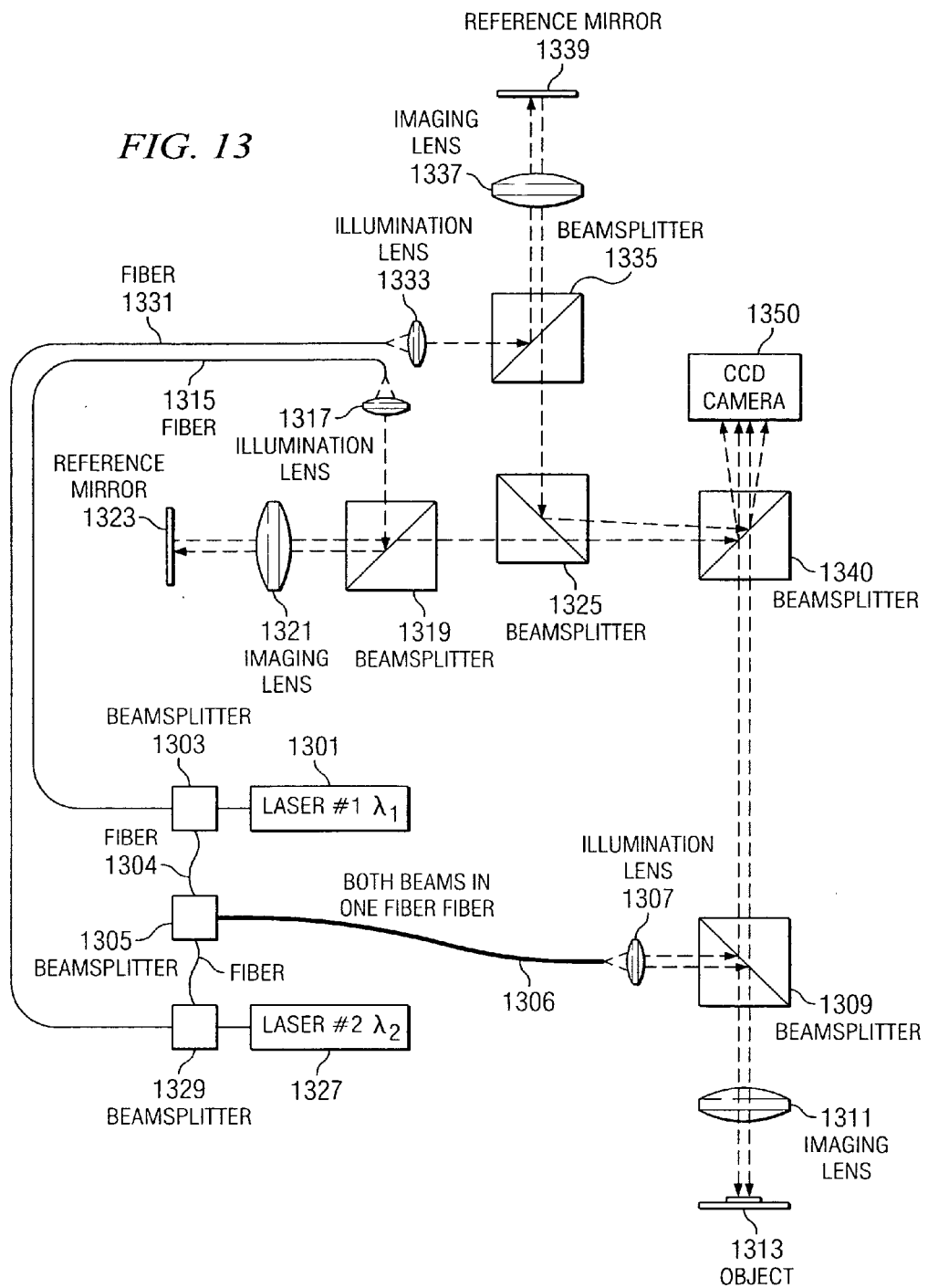
FIG. 13 illustrates a schematic view of another optical layout, representing an embodiment of the invention.

Referring to FIG. 13, an exemplary embodiment of the invention is depicted that uses optical fibers and reference mirrors. A laser 1301 operating at a wavelength of $\lambda_1$ is optically coupled to a beamsplitter 1303. An optical fiber 1304 is coupled to the beamsplitter 1303. A beamsplitter 1305 is coupled to the fiber 1304. A fiber 1306 is coupled to the beamsplitter 1305. An illumination lens 1307 is optically coupled to the fiber 1306. A beamsplitter 1309 is optically coupled to the illumination lens 1307. An imaging lens 1311 is optically coupled to the beamsplitter 1309. A object 1313 having an area of interest is optically coupled to the imaging lens 1311. An optical fiber 1315 is coupled to the beamsplitter 1303. An illumination lens 1317 is optically coupled to the fiber 1315. A beamsplitter 1319 is optically coupled to the illumination lens 1317. An imaging lens 1321 is optically coupled to the beamsplitter 1319. A reference mirror 1323 is optically coupled to the imaging lens 1321.

Still referring to FIG. 13, another laser 1327 operating at a wavelength of $\lambda_2$ is optically coupled to a beamsplitter 1329. An optical fiber 1330 is coupled to the beamsplitter 1329. An optical fiber 1330 is coupled to the beamsplitter 1329 and to the beamsplitter 1305. An optical fiber 1331 is coupled to the beamsplitter 1329. An illumination lens 1333 is optically coupled to the fiber 1331. A beamsplitter 1335 is optically coupled to the illumination lens 1333 and to the beamsplitter 1325. An imaging lens 1337 is optically coupled to the beamsplitter 1335. A beamsplitter 1340 is optically coupled to the beamsplitter 1325 and to the beamsplitter 1309. A charge coupled device camera 1350 is optically coupled to the beamsplitter 1340.

FIG. 13 shows one preferred optical setup for acquiring the two holograms substantially simultaneously. In this configuration, one of two interposed meta-subassemblies includes $\lambda_1$ from Laser #1 is shown in the configuration described in U.S. patent application Ser. No. 09/477,267 filed Jan. 4, 2000 (published PCT/US00/34982), entitled Improvements to Acquisition and Replay Systems for Direct-to-Digital Holography and Holovision by Clarence E. Thomas and Gregory R. Hanson To first meta-subassembly is combined with a second meta-subassembly that includes $\lambda_2$ from Laser #2. In the object arm of this combined system, both wavelengths are collinear through the fiber and optical system. In the reference arm, we produce two separate reference beams (one for each wavelength). The $\lambda_1$ reference arm is in the standard configuration, while the $\lambda_2$ reference arm is rotated 90 degrees so that it may be combined with the $\lambda_1$ reference beam via a beamsplitter. This beamsplitter allows the $\lambda_2$ reference beam to be adjusted to produce the desired spatial fringes on the CCD independent of the $\lambda_1$ spatial fringes produced with the standard beamsplitter located just in front of the CCD camera. The 2 reference beam is angle of incidence is adjusted to produce the fringes on the CCD at an angle approximately perpendicular to the $\lambda_1$ fringes. Although having the two sets of fringes approximately perpendicular is the preferred implementation, it is not a requirement.

The CCD image is acquired and transformed to frequency space via a FFT operation. In frequency space, we now have two spatially-heterodyned images of the same object but acquired at two different wavelengths. Now each spatially-heterodyned image can be isolated from the other image and from the zero order reference beam, and then transformed back to real space to yield the phase and amplitude image. Once this is done to both spatially-heterodyned images, their phase (and amplitude if desired) difference can be obtained simply by subtracting the phase values. The beat wavelength produced by this subtraction is then given by $\lambda_b = \lambda_1 * \lambda_2 / (\lambda_1 - \lambda_2)$.

Example 4

Figure 14:
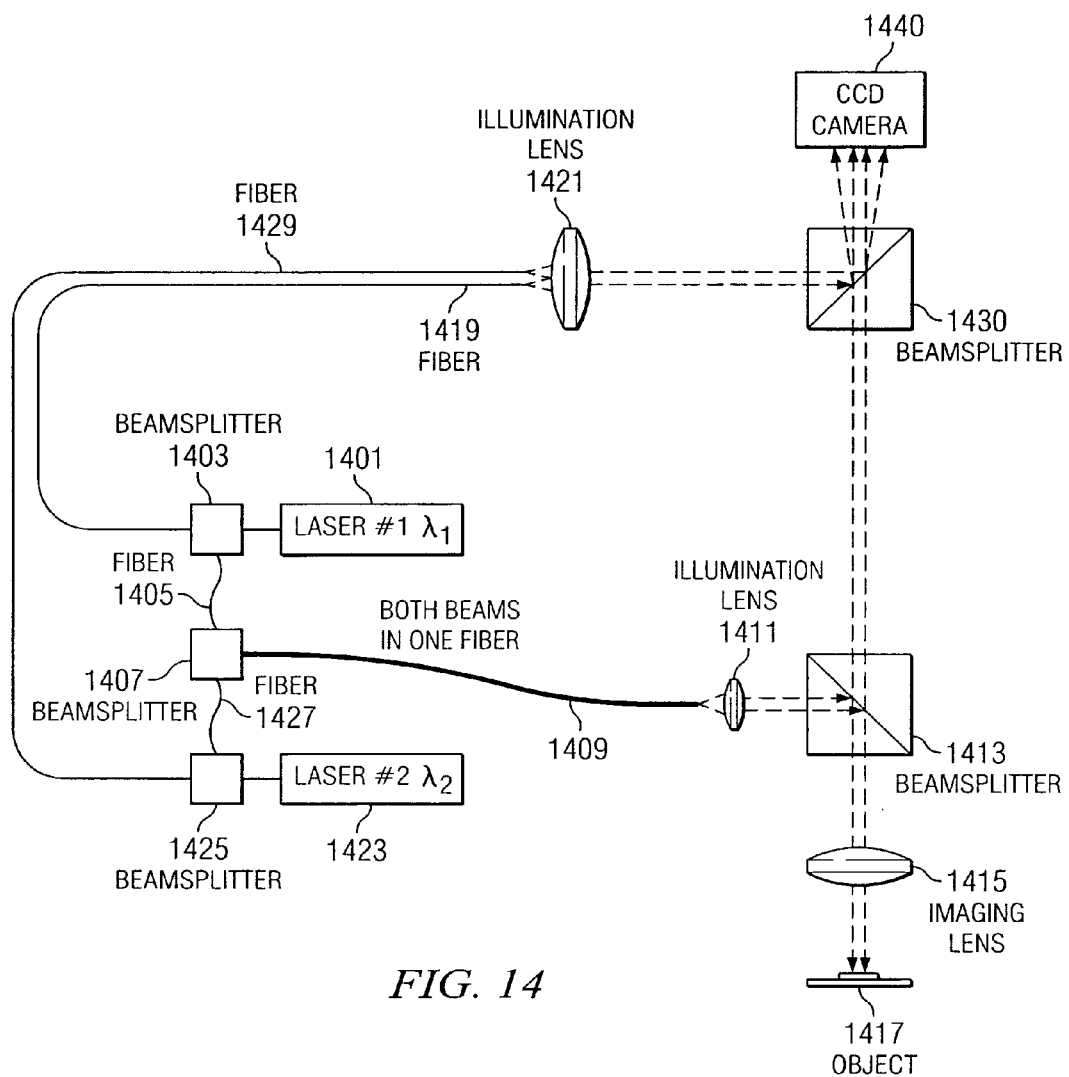
FIG. 14 illustrates a schematic view of another optical layout, representing an embodiment of the invention.

Referring to FIG. 14, a exemplary embodiment of the invention utilizes optical fiber for some connections and omits the use of reference mirrors is depicted. A laser 1401 operating at a wavelength of $\lambda_1$ is optically coupled to a beamsplitter 1403. A optical fiber 1405 is coupled to the beamsplitter 1403. A beamsplitter 1407 is coupled to the optical fiber 1405. An optical fiber 1409 is coupled to the beamsplitter 1407. An illumination lens is 1411 is optically coupled to the fiber 1409. A beamsplitter 1413 is optically coupled the illumination lens 1411. An imaging lens 1415 is optically coupled to the beamsplitter 1413. An object 1417 having a surface area of interest is optically coupled to the imaging lens 1415. An optical fiber 1419 is coupled to the beamsplitter 1403. An illumination lens 1421 is optically coupled to the fiber 1419.

Still referring to FIG. 14, a laser 1423 operating at a wavelength of $\lambda_2$ is optically coupled to a beamsplitter 1425. An optical fiber 1427 is coupled to the beamsplitter 1425 and to the beamsplitter 1407. An optical fiber 1429 is coupled to the beamsplitter 1425 and to the illumination lens 1421. A beamsplitter 1430 is optically coupled to the illumination lens 1421 and to the beamsplitter 1413. A charge coupled device camera 1440 is optically coupled to the beamsplitter 1430.

Another preferred optical configuration is shown in FIG. 14. In this configuration, the reference beam paths which were carefully matched to the object beam path are replaced with a lens or lens system. This lens or lens system produces the required wavefront to produce the required linear fringes when mixed with the object beam of the same wavelength. This technique of replacing the reference beam path with a simple lens system is a common practice in digital holography, holographic contouring and holographic interferometry. However, the inclusion of two wavelengths into one system to produce two separate holograms substantially simultaneously on one CCD camera is novel. In our configuration, the object arm is unchanged from the previous layout (both wavelengths brought together into one fiber) but the reference arms are completely removed. In their place is a lens or lens system which will collect the light from the fiber output and focus it onto the CCD with the required wavefront curvature to match the object beam. The second wavelength reference beam is brought into the beamsplitter at an angle relative to the first. The position and angle of this second beam is adjusted to produce the desired orientation of the linear fringes, i.e. rotated approximately 90 degrees to the first set of fringes. The processing of the CCD image then proceeds as previously discussed.

Example 5

Figure 15:
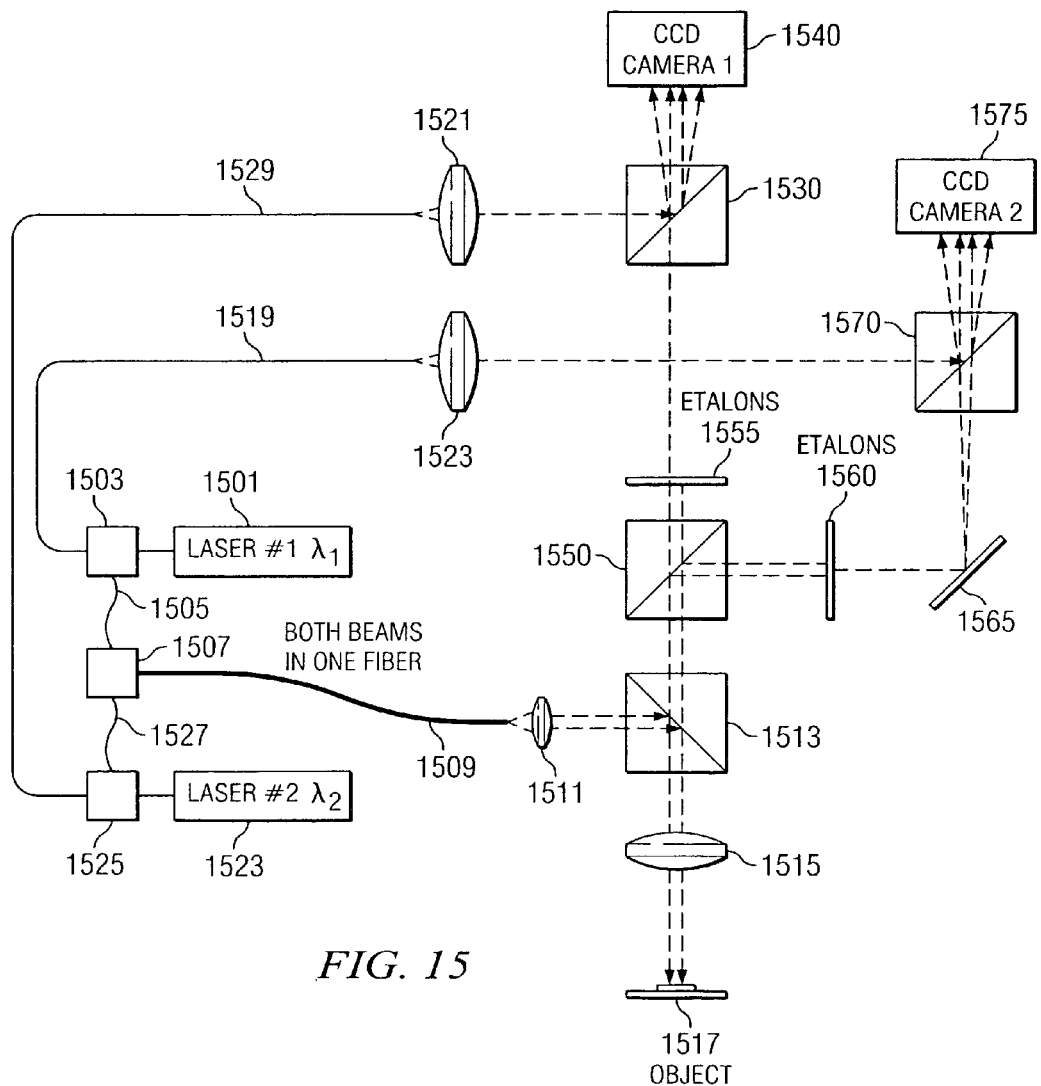
FIG. 15 illustrates a schematic view of another optical layout, representing an embodiment of the invention.

Referring to FIG. 15, another exemplary embodiment of the invention that utilizes optical fiber for some connections and omits the use of reference mirrors is depicted. This embodiment uses two CCD cameras to help maintain lateral resolution. A laser 1501 operating at a wavelength of $\lambda_1$ is optically coupled to a beamsplitter 1503. A optical fiber 1505 is coupled to the beamsplitter 1503. A beamsplitter 1507 is coupled to the optical fiber 1505. An optical fiber 1509 is coupled to the beamsplitter 1507. An illumination lens is 1511 is optically coupled to the fiber 1509. A beamsplitter 1513 is optically coupled the illumination lens 1511. An imaging lens 1515 is optically coupled to the beamsplitter 1513. An object 1517 having a surface area of interest is optically coupled to the imaging lens 1515. An optical fiber 1519 is coupled to the beamsplitter 1503. An illumination lens 1523 is optically coupled to the fiber 1519.

Still referring to FIG. 15, a laser 1523 operating at a wavelength of $\lambda_2$ is optically coupled to a beamsplitter 1525. An optical fiber 1527 is coupled to the beamsplitter 1525 and to the beamsplitter 1507. An optical fiber 1529 is coupled to the beamsplitter 1525. An illumination lens 1521 is optically coupled to the optical fiber 1529. A beamsplittler 1550 is optically coupled to the beamsplitter 1513. A first etalon 1555 is optically coupled to the beamsplitter 1550. A beamsplitter 1530 is optically coupled to the first etalon 1555 and the illumination lens 1521. A first charge coupled device camera 1540 is optically coupled to the beamsplitter 1530. A second etalon 1560 is also optically coupled to the beamsplitter 1550. A mirror 1565 is optically coupled to the second etalon 1560. A beamsplitter 1570 is optically coupled to the second etalon 1560 and the illumination lens 1523. A second charge coupled device camera 1575 is optically coupled to the beamsplitter 1570.

Still referring to FIG. 15, the first etalon 1555 passes $\lambda_2$ and the second etalon 1560 passes $\lambda_1$. It is important that the beam path lengths for the two wavelengths ($\lambda_1$ from object 1517 to the first CCD camera 1540 and $\lambda_2$ from object 1517 to the second CCD camera 1575) be adjusted so that the magnification between the object and each camera is substantially identical for both wavelengths. In this way, lateral resolution can be substantially maintained.

Practical Applications of the Invention

A practical application of the invention that has value within the technological arts is high resolution metrology for manufacturing, surface inspection of manufactured parts, 3-D imaging of large objects, a 3-D microscope, and all uses discussed in U.S. Pat. No. 6,078,392 issued Jun. 20, 2000, entitled Direct-To-Digital Holography, Holographic Interferometry, and Holovision to Clarence E. Thomas, Larry R. Baylor, Gregory R. Hanson, David A. Rasmussen, Edgar Voelkl, James Castracane, Michele Sumkulet and Lawrence Clow; and U.S. patent application Ser. No. 09/477,267 filed Jan. 4, 2000 (published PCT/US00/34982), entitled Improvements to Acquisition and Replay Systems for Direct-to-Digital Holography and Holovision by Clarence E. Thomas and Gregory R. Hanson. Due to the current use of direct to digital holograhy in the semiconductor Industry, the invention will be appreciated as having significant application to parts of this market.

The invention is useful for micro-electro-mechanical system (MEMS) inspection. A key feature of the invention in the context of this application is the greatly simplified optical path, specifically the simplified reference beam optics. The invention can include the use of pulsed laser beams and synchronizing their pulses to the movement of an object to freeze the motion.

Traditional holography is based on analog recording of the hologram on films or glass plates, because digital recording devices such as charge coupled devices (CCD) generally lack the resolution to preserve the phase information. The need to process the analog images off-line before recorded data can be recovered and digitized for detailed analysis has prevented the use of holography as an on-line, real-time inspection technique. The DDH technique overcomes this limitation by using a very small angle between the object beam and the reference beam, a magnification of the object with respect to the image plane of the camera, and advances in pixel density of digital recording devices, to make it possible to digitally record the spatially-heterodyned hologram(s) directly. The resolution of the technique is dependent on the wavelength of the probing coherent laser light. A version based on a deep-UV laser is presently being developed to achieve real-time processing with 39 nm resolution and 10:1 aspect ratio, using a pulsed laser, a high density fast CCD, and FPGA-based signal processing to inspect 300 mm wafers at the rate of several wafers per hour. The DDH technique, represents a significant advance in rapid, high-resolution topographic mapping of static features.

By using pulsed illumination, it is possible to track the motion of MEMS elements. However, because the technique depends on measuring the phase shift of the probing coherent light source to deduce depth information, it is unable to resolve depths that are multiples of the half-wavelength ($\lambda/2$) of the light source. The range of measurements can be extended by using a very long wavelength, at a cost of resolution. One well-known approach to extend the range while retaining the resolution capability is to use two wavelengths in close proximity of each other[3]. In this approach, phase information with high resolution is obtained independently at two separate wavelengths. These two sets of phase data are then subtracted to transform the phase data to a scale wavelength equal to the beat wavelength $\lambda_b = (\lambda_1 \lambda_2)/(\lambda_1 - \lambda_2)$. Thus the range can be deduced from the phase of the effective wavelength that is much longer than either of the two probing wavelengths.

This approach to two-wavelength measurements can be implemented with DDH by sequentially (separate digital images) recording phase images at two different wavelengths, and then obtaining their difference. However, this sequential technique suffers from several limitations. First, noise in each individual image will be uncorrelated. The phase-image noise results in height errors proportional to the laser wavelength. When the difference between the two images is taken, the noise will be carried into the difference-phase image, but now it will be proportional to the beat wavelength $\lambda_b$. Thus the image quality and accuracy will be severely degraded. Second, any motion in the object between the acquisition of each image will result in pixel-to-pixel differences between the images. When the two phase images are subtracted, new errors will be introduced due to the pixel-to-pixel changes. Finally, acquiring each phase image sequentially increases the imaging time and limits the real-time ability of a potential system.

Since the invention can include obtaining the two phase-images substantially simultaneously using the same optics and digital camera, high-resolution differential-phase images with a scale-length of the beat wavelength can be generated. Image noise will be reduced because common-mode noise, vibrations etc. will be correlated and cancel out when the difference image is obtained. If the two phase-images are obtained substantially simultaneously in the same optics system with one digital camera, there is always exact pixel-to-pixel alignment and correlation. Finally, high-resolution topography is still achievable because the phase information for each individual wavelength is recorded.

The invention can include a method for inspection of MEMS devices using a Spatial-heterodyne Differential Digital Holography (SDDH) technique to perform pulsed, two-wavelength differential-phase imaging in a single digital image. As previously noted, because the inventors use the interference of an object and a reference beam to spatially-heterodyne the object image at a particular spatial frequency, a second heterodyned image at a different spatial frequency can be generated by introducing a second laser beam at a slightly different wavelength into the optics system. The second laser can be oriented with the necessary angular differences to produce quasi-orthogonal, preferably substantially orthogonal fringes so that the two images (of the same object area) can be separated and processed independently even though they are acquired in a single digital image. The two different wavelength lasers should have substantially no coherence between them to acquire both heterodyned images substantially simultaneously. A possible arrangement for such a two-wavelength system is shown in FIG. 1. With this system, by determining a difference between (e.g., subtracting) the two phase images, it is possible to measure surfaces with topographical (height) variations significantly greater than the imaging laser wavelengths in a single digital image. These topographical features can include both step height changes (cliffs) and continuously sloped surfaces (spheres, wedges etc).

As shown in FIG. 1, this system can utilize a system of two diode-pumped crystal lasers to generate substantially simultaneously, but in separate beam paths, both a tunable wavelength laser pulse and a fixed wavelength laser pulse. A fiber optic delivery system can be used to transport the laser pulses to the necessary location in the interferometer system. Fiber beam splitters can be used to split each laser beam into object and reference beams. Acousto-optic modulators (AOMs) can be located in the beam path(s) to allow shuttering and amplitude control of the laser beams. To obtain the necessary optical mode and polarization, spatial filters and polarizers can be located at the end of each fiber. From the spatial-filters, the object laser beams enter the free-space optical system where a set of lenses and beam-splitters guide the beams to the object under inspection and then to the CCD. The reference beams are brought to the CCD in a similar fashion and combined with the object beams to form two quasi-orthogonal holograms in a single image. As can be seen in FIG. 1, the optical layout is relatively simple and through the use of optical fibers, the system can be quite compact.

To implement this system, a fixed wavelength (say at 532 nm) can be used for all measurements. The second laser with tunable wavelength (or a selection of lasers at different wavelengths) can be used as the second wavelength for making two-wavelength measurements. A tunable wavelength output from 500 nm to 531 nm will provide a range of beat wavelengths from approximately 8 µm to 280 µm, respectively, which can be utilized to accurately measure height displacements to well over 100 µm. By incorporating several microscope objectives, the field of view can be varied to acquire high-resolution (better than 1 µm in-plane and 10 nm out-of-plane) and low-resolution (4 µm in-plane and 10 nm out-of-plane) images. This system can measure large displacements both in-plane and out-of-plane for multiple movable elements in a MEMS device substantially simultaneously. By utilizing a 5 ns laser pulse, very high-speed movements can be captured by the imaging system to freeze the motion of moving parts and monitor their dynamic behavior in transient or repetitive motion. Using the stroboscopic effect, repetitive motion can be captured and replayed in slow motion.

Thus, the invention is useful as a technique for rapid characterization of the dynamic behavior of movable elements in MEMS devices at the wafer level. Existing techniques are limited to either wafer level inspection of static features, which cannot provide information on dynamic response characteristics, or dynamic response of a single element on a die, which would not be suitable for use for quality control on a production line that requires high throughput.

The proper functioning of moving elements in a MEMS device is one of their most fundamental performance requirements. There are many factors that can contribute toward failure of a MEMS to meet specification. Principal among them are incomplete release and particulate contaminations during fabrication. Other factors include dimensional variations, stringers (extraneous material), undue residual stress, and stiction (bonding by Van der Waals force). These factors can contribute to deviations from design values such as limited excursion range, reduced frequency response, changes in natural and resonant frequencies, power and excitation voltage requirements, etc. or, at worst, resulting in the device being completely non-functional. Therefore, it is imperative that the performance of each device be fully validated. For MEMS to meet their promise of being able to be mass-produced with high reliability at low cost, such validation needs be performed at the wafer level with high throughputs.

Although the fabrication of MEMS has benefited significantly from technologies developed for the microelectronics industry in the fabrication of integrated circuits (IC), this is not the case for characterization and inspection. This is because there are significant differences in their functionality and physical parameters. A comparison of the key physical parameters and characterization requirements are shown in Table I.

TABLE I

Comparison of typical physical parameters of IC's versus MEMS

| Device Parameters | IC's | MEMS |
| --- | --- | --- |
| Film Thickness (µm) | <1 | 2-6 |
| Critical Dimensions (µm) | 0.13 to 0.35 | 1 |
| Aspect Ratio | Generally less than 2:1 except for vias | Can be 10:1 or even greater |
| Topography (µm) | <1 | 4-10 |
| Device Size (µm) | 1 | 100 |
| Resolution (µm) | ~0.04 | <0.10 |
| Range (µm) | 1 | 10's to 100's |
| Mechanical Frequency Response (kHz) | 0 | 100's to 1000's |

The challenges for testing MEMS devices can be appreciated by reference to Table I. Whereas the feature sizes of MEMS devices can be greater than that for IC's, the resolution requirements are essentially the same, while the aspect ratio and the testing range (depth of field for optical technique) is much greater. In addition, some of the MEMS devices have moving elements that operate at very high frequencies. Further, because the mass of the moving elements are very small, their dynamic response is strongly affected by small dimensional and material variations, as well as air viscosity and temperature effects. Therefore, characterization and testing need to be carried out in a vacuum capable system in which the testing environment can be controlled. From the above considerations, the basic requirements for testing MEMS devices during the fabrication process are: measurement resolution of 10's of nm; measurement range of 100's of µm; field of view of 10's to 100's of mm$^2$; depth of field of 10's to 100's of µm; ability to track motion at high frequencies; high throughput with characterization results provided in real-time; and provide vacuum capable controlled environment. The invention is useful for simultaneously meeting all, of these requirements.

Advantages of the Invention

The advantages of the two-wavelength differential spatially-heterodyned direct to digital holography are twofold. First this technique allows objects with depth variation many times greater than the probing beam wavelength to be imaged without losing track of the $2\pi$ phase changes. In single wavelength spatially-heterodyned direct to digital holography, it is required that each hologram image have at least 2 CCD pixels per $2\pi$ of phase shift ($2\pi$ of phase shift is generated for every $\lambda/2$ of height change) due to object height changes; less than this and integral values of $2\pi$ are lost. With the two-wavelength differential technique, the requirement is now that we have at least 2 CCD pixels per $2\pi$ of phase shift in the differential-phase image, where each $2\pi$ is now a result of height changes equal to one half the beat wavelength. The two probing beam wavelengths, $\lambda_1$ and $\lambda_2$, can be chosen so that the beat wavelength is many times larger than either $\lambda_1$ or $\lambda_2$. The additional benefit of obtaining the two spatially-heterodyned direct to digital holograms substantially simultaneously is that noise in the phase (and amplitude) images resulting from back reflections, scattering, vibrations etc. will be common to both images and so will be reduced when the difference of the two individual images is taken.

The terms a or an, as used herein, are defined as one or more than one. The term plurality, as used herein, is defined as two or more than two. The term another, as used herein, is defined as at least a second or more. The terms comprising (comprises), including (includes) and/or having (has), as used herein, are defined as open language (i.e., requiring what is thereafter recited, but open for the inclusion of unspecified procedure(s), structure(s) and/or ingredient(s) even in major amounts. The phrases consisting of and/or composed of close the recited method, apparatus or composition to the inclusion of procedures, structure(s) and/or ingredient(s) other than those recited except for ancillaries, adjuncts and/or impurities ordinarily associated therewith. The recital of "essentially" along with "consisting of" or "composed of" renders the recited method, apparatus and/or composition open only for the inclusion of unspecified procedure(s), structure(s) and/or ingredient(s) which do not materially affect the basic novel characteristics of the composition. The term coupled, as used herein, is defined as connected, although not necessarily directly, and not necessarily mechanically. The term approximately, as used herein, is defined as at least close to a given value (e.g., preferably within 10% of, more preferably within 1% of, and most preferably within 0.1% of). The term substantially, as used herein, is defined as largely but not necessarily wholly that which is specified. The term generally, as used herein, is defined as at least approaching a given state. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer or computer system.

All the disclosed embodiments of the invention disclosed herein can be made and used without undue experimentation in light of the disclosure. The invention is not limited by theoretical statements recited herein. Although the best mode of carrying out the invention contemplated by the inventor(s) is disclosed, practice of the invention is not limited thereto. Accordingly, it will be appreciated by those skilled in the art that the invention may be practiced otherwise than as specifically described herein.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

All the disclosed elements and features of each disclosed embodiment can be combined with, or substituted for, the disclosed elements and features of every other disclosed embodiment except where such elements or features are mutually exclusive. Variation may be made in the steps or in the sequence of steps composing methods described herein.

Although the holographic apparatus described herein can be a separate module, it will be manifest that the holographic apparatus may be integrated into the system with which it is (they are) associated. The individual components need not be combined in the disclosed configurations, but could be combined in virtually all configurations.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

REFERENCES

1. U.S. Pat. No. 6,078,392 issued Jun. 20, 2000, entitled Direct-To-Digital Holography, Holographic Interferometry, and Holovision to Clarence E. Thomas, Larry R. Baylor, Gregory R. Hanson, David A. Rasmussen, Edgar Voelkl, James Castracane, Michele Sumkulet and Lawrence Clow.
2. U.S. Ser. No. 09/477,267 filed Jan. 4, 2000 (published PCT/US00/34982), entitled Improvements to Acquisition and Replay Systems for Direct-to-Digital Holography and Holovision by Clarence E. Thomas and Gregory R. Hanson.
3. Wagner et al., "Direct Shape Measurement By Digital Wavefront Reconstruction and Multi-Wavelength Contouring," Opt. Eng., 39(1), January 2000, pages 79-85.
4. E. Voelkl, "High Resolution Electron Holography," Dissertation, Eberhard-Karls-Universitat, Tubingen, Germany, 1991.

What is claimed is:

1. A method of obtaining a differential-phase spatially-heterodyned hologram at a beat wavelength defined by a first wavelength and a second wavelength, comprising:
    digitally recording a first spatially-heterodyned hologram at the first wavelength, the first spatially-heterodyned hologram including spatial heterodyne fringes for Fourier analysis; and substantially simultaneously
    digitally recording a second spatially-heterodyned hologram at the second wavelength that is different from the first wavelength, the second spatially-heterodyned hologram including spatial heterodyne fringes for Fourier analysis; then
    Fourier analyzing the recorded first spatially-heterodyned hologram by shifting a first original origin of the recorded first spatially-heterodyned hologram including spatial heterodyne fringes in Fourier space to sit on top of a spatial-heterodyne carrier frequency defined as a first angle between a first reference beam and a first object beam;
    Fourier analyzing the recorded second spatially-heterodyned hologram by shifting a second original origin of the recorded second spatially-heterodyned hologram including spatial heterodyne fringes in Fourier space to sit on top of a spatial-heterodyne carrier frequency defined as a second angle between a second reference beam and a second object beam, the first angle and the second angle not substantially equal;
    applying a first digital filter to cut off signals around the first original origin and performing an inverse Fourier transform on the result;
    applying a second digital filter to cut off signals around the second original origin and performing an inverse Fourier transform on the result; and then
    determining a difference between a filtered analyzed recorded first spatially heterodyne hologram phase and a filtered analyzed recorded second spatially-heterodyned hologram phase.

2. The method of claim 1, further comprising:
calculating a phase ambiguity described by $k_1(x)$ as $$k_1(x) = \frac{z_b(x)}{\lambda_1} - \frac{\varphi_1(x)}{2\pi},$$

where $\phi_1(x)$ is a measured phase a wavelength selected from the group consisting of the first wavelength and the second wavelength $\lambda_1$, and $Z_b(x)$ is the surface profile for the beat wavelength $\lambda_b$; and calculating a surface profile with reduced noise described by z(x) as $$z(x) = \frac{\lambda_1}{2\pi}(\varphi_1(x) \pm 2\pi k_1(x)).$$

3. The method of claim 1, wherein a single pixilated detection device is used to digitally record the first spatially-heterodyned hologram at the first wavelength and the second spatially-heterodyned hologram at the second wavelength.

4. A method of obtaining a differential-phase spatially-heterodyned hologram at a beat wavelength defined by a first wavelength and a second wavelength, comprising:
digitally recording a first spatially-heterodyned hologram at the first wavelength, the first spatially-heterodyned hologram including spatial heterodyne fringes for Fourier analysis;
Fourier analyzing the recorded first spatially-heterodyned hologram by shifting a first original origin of the recorded first spatially-heterodyned hologram including spatial heterodyne fringes in Fourier space to sit on top of a spatial-heterodyne carrier frequency defined as a first angle between a first reference beam and a first object beam;
digitally recording a second spatially-heterodyned hologram at the second wavelength that is different from the first wavelength, the second spatially-heterodyned hologram including spatial heterodyne fringes for Fourier analysis;
Fourier analyzing the recorded second spatially-heterodyned hologram by shifting a second original origin of the recorded second spatially-heterodyned hologram including spatial heterodyne fringes in Fourier space to sit on top of a spatial-heterodyne carrier frequency defined as a second angle between a second reference beam and a second object beam;
applying a first digital filter to cut off signals around the first original origin and performing an Inverse Fourier transform on the result;
applying a second digital filter to cut off signals around the second original origin and performing an inverse Fourier transform on the result; and then
determining a difference between a filtered analyzed recorded first spatially-heterodyned hologram phase and a filtered analyzed recorded second spatially-heterodyned hologram phase.

5. The method of claim 4, further comprising:
calculating a phase ambiguity described by $k_1(x)$ as $$k_1(x) = \frac{z_b(x)}{\lambda_1} - \frac{\varphi_1(x)}{2\pi},$$

where $\phi_1(x)$ is a measured phase a wavelength selected from the group consisting of the first wavelength and the second wavelength $\lambda_1$, and $Z_b(x)$ is the surface profile for the beat wavelength $\lambda_b$; and calculating a surface profile with reduced noise described by z(x) as $$z(x) = \frac{\lambda_1}{2\pi}(\varphi_1(x) \pm 2\pi k_1(x)).$$

6. The method of claim 4, wherein the first angle and the second angle are substantially equal and digitally recording the first spatially-heterodyned hologram at the first wavelength is completed before digitally recording the second spatially-heterodyned hologram.

7. A method of obtaining a differential-phase hologram at a beat wavelength defined by a first wavelength and a second wavelength, comprising:
digitally recording a first spatially-heterodyned hologram at the first wavelength, the first spatially-heterodyned hologram including spatial heterodyne fringes for Fourier analysis;
digitally recording a second spatially-heterodyned hologram at the second wavelength that is different from the first wavelength, the second spatially-heterodyned hologram including spatial heterodyne fringes for Fourier analysis;
Fourier analyzing the recorded first spatially-heterodyned hologram by shifting a first original origin of the recorded first spatially-heterodyned hologram including spatial heterodyne fringes in Fourier space to sit on top of a spatial-heterodyne carrier frequency defined as a first angle between a first reference beam and a first object beam;
applying a first digital filter to cut off signals around the first original origin and performing and inverse Fourier transform on the result;
Fourier analyzing the recorded second spatially-heterodyned hologram by shifting a second original origin of the recorded second spatially-heterodyned hologram including spatial heterodyne fringes in Fourier space to sit on top of a spatial-heterodyne carrier frequency defined as a second angle between a second reference beam and a second object beam;
applying a second digital filter to cut off signals around the second original origin and performing and inverse Fourier transform on the result; and then
determining a difference between a filtered analyzed recorded first spatially heterodyne hologram phase and a filtered analyzed recorded second spatially-heterodyned hologram phase;
wherein digitally recording the first spatially-heterodyned hologram at the first wavelength is completed before digitally recording the second spatially-heterodyned hologram.

8. The method of claim 7, further comprising:
calculating a phase ambiguity described by $k_1(x)$ as $$k_1(x) = \frac{z_b(x)}{\lambda_1} - \frac{\varphi_1(x)}{2\pi},$$

where $\phi_1(x)$ is a measured phase a wavelength selected from the group consisting of the first wavelength and the second wavelength $\lambda_1$, and $Z_b(x)$ is the surface profile for the beat wavelength $\lambda_b$; and calculating a surface profile with reduced noise described by $z(x)$ as $$z(x) = \frac{\lambda_1}{2\pi}(\varphi_1(x) \pm 2\pi k_1(x)).$$

* * * * *